US007970547B2

(12) United States Patent
Shapiro et al.

(10) Patent No.: US 7,970,547 B2
(45) Date of Patent: Jun. 28, 2011

(54) PROGRAMMABLE AND AUTONOMOUS COMPUTING MACHINE MADE OF BIOMOLECULES

(75) Inventors: Ehud Shapiro, Nataf (IL); Yaakov Benenson, Tel Aviv (IL); Rivka Adar, Carmei Yosef (IL); Tamar Paz-Elizur, Rehovot (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 1275 days.

(21) Appl. No.: 10/493,304

(22) PCT Filed: Nov. 14, 2002

(86) PCT No.: PCT/IL02/00915
§ 371 (c)(1),
(2), (4) Date: May 3, 2004

(87) PCT Pub. No.: WO03/042395
PCT Pub. Date: May 22, 2003

(65) Prior Publication Data
US 2005/0075792 A1    Apr. 7, 2005

Related U.S. Application Data

(60) Provisional application No. 60/331,318, filed on Nov. 14, 2001, provisional application No. 60/386,418, filed on Jun. 7, 2002.

(51) Int. Cl.
*G06F 19/00* (2006.01)
*C12P 19/34* (2006.01)
*C12Q 1/68* (2006.01)

(52) U.S. Cl. .............................. 702/19; 435/91.2; 435/6

(58) Field of Classification Search ........................ None
See application file for complete search history.

(56) References Cited

U.S. PATENT DOCUMENTS

| | | | |
|---|---|---|---|
| 4,965,188 A | | 10/1990 | Mullis et al. |
| 5,804,373 A | * | 9/1998 | Schweitzer et al. .............. 435/6 |
| 6,197,563 B1 | | 3/2001 | Erlich et al. |
| 6,266,569 B1 | * | 7/2001 | Shapiro et al. .................... 700/1 |
| 6,514,736 B1 | * | 2/2003 | Erlich et al. .................. 435/194 |
| 2002/0119458 A1 | * | 8/2002 | Suyama et al. .................... 435/6 |

OTHER PUBLICATIONS

Barany (PNAS (1991) vol. 88, pp. 189-193.*
Adleman "Molecular Computation of Solutions to Combinatorial Problems", Science, 266(5187): 1021-1024, 1994.
Benenson et al. "Programmable and Autonomous Computing Machine Made of Biomolecules", Nature, 414: 430-434, 2001.
Bennett "The Thermodynamics of Computation—, A Review", International Journal of Theoretical Physics, 21(12): 905-940, 1982.
Keyes et al. "Minimal Energy Dissipation in Logic", IBM J. Res. Develop., 14: 152-156, 1970.
Bennett "Logical Reversibility of Computation", IBM J. Res. Develop., 17: 525-532, 1973.
Benioff "Quantum Mechanical Models of Turing Machines That Dissipate No Energy", Physical Review Letters, 48(23): 1581-1585, 1982.
Zurek "Thermodynamic Cost of Computation, Algorithmic Complexity and the Information Metric", Nature, 341: 119-124, 1989.
Li et al. "Reversibility and Adiabatic Computation: Trading Time and Space for Energy", Proceedings: Mathematical, Physical and Energineering Sciences, 452(1947): 769-789, 1996.
Rothemund "A DNA and Restriction Enzyme Implementation of Turing Machines", DIMACS Series in Discrete Mathematics and Theoretical Computer Science, 27: 75-119, 1996.
Winfree et al. "Design and Self-Assembly of Two-Dimensional DNA Crystals", Nature, 394: 539-544, 1998.
Khodor et al. "Design and Implementation of Computational System Based on Programmed Mutagenesis", BioSystems, 52(1-3): 93-97, 1999.
Smith "DNA Computers in Vitro and Vivo", DIMACS Series in Discrete Mathematics and Theoretical Computer Science, 27: 121-185, 1996.
Garzon et al. "In Vitro Implementation of Finite-State Machines", Automata Implementation: Lecture Notes in Computer Science, 1436: 56-74, 1998.
Lipton "DNA Solution of Hard Computational Problems", Science, 268(5210): 542-545, 1995.
Quyang et al. "DNA Solution of the Maximal Clique Problem", Science, 278(5337): 446-449, 1997.
Liu et al. "DNA Computing on Surfaces", Nature, 403: 175-179, 2000.
Faulhammer et al. "Molecular Computation: RNA Solutions to Chess Problems", Proc. Natl. Acad. Sci. USA, 97(4): 1385-1389, 2000.
Sakamoto et al. "State Transitions by Molecules", BioSystems, 52: 81-91, 1999.
Mao et al. "Logical Computation Using Algorithmic Self-Assembly of DNA Triple-Crossover Molecules", Nature, 407: 493-496, 2000.
Braich et al. "Solution of A 20-Variable 3-SAT Problem on A DNA Computer", Science, 296: 499-502, 2002.
Lehn "Toward Complex Matter: Supramolecular Chemistry and Self-Organization", Proc. Natl. Acad. Sci. USA, 99(8): 4763-4768, 2002.
Stojanovic et al. "A Deoxyribozyme-Based Molecular Automation", Nature Biotechnology, 21(9): 1069-1074, 2003.
Benenson et al. "An Autonomous Molecular Computer for Logical Control of Gene Expression", Nature, 429: 423-429, 2004.

(Continued)

*Primary Examiner* — Lori A Clow
(74) *Attorney, Agent, or Firm* — Graeser Associates Internation; Gvorah Graeser

(57) ABSTRACT

A device, system and method for molecular computing which not only includes a suitable, renewable power source, but actually is able to receive power through the performance of the computations themselves. The molecular computing machine of the present invention actually employs the free-energy difference between its input and output to accomplish a computation, preferably by using its input DNA molecule as a partial source of energy, or alternatively by using the input DNA molecule as the sole source of energy. This molecular finite automaton preferably transforms an input DNA molecule into an output DNA molecule by digesting the input as it computes.

33 Claims, 11 Drawing Sheets

OTHER PUBLICATIONS

Adar et al. "Stochastic Computing With Biomolecular Automata", Proc. Natl. Acad. Sci. USA, 101(27): 9960-9965, 2004.

Soloveichik "The Computational Power of Benenson Automata", Eprint ARXIV, p. 1-22, 2004.

Jonoska et al. "Transducers With Programmable Input by DNA Self-Assembly", Molecular Computing, LNCS, 2950: 219-240, 2004.

Zhang et al. "Development of Nano-Scale DNA Computing Devices", Current Nanoscience, 1: 89-9, 2005.

Braich et al, DNA Computing, 6th International Workshop on DNA-Based Computers, DNA 2000, Leiden, The Netherlands, Jun. 13-17, Lecture Notes in Computer Science 2054: 27-42.

* cited by examiner

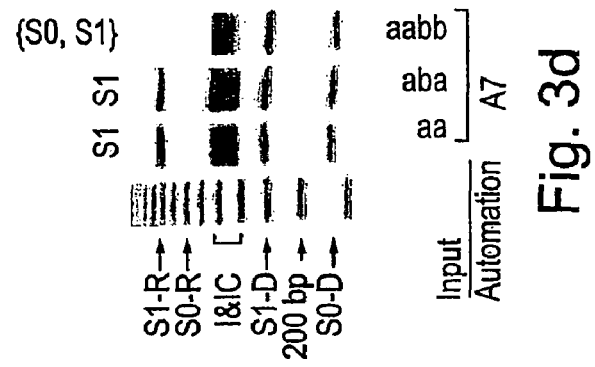
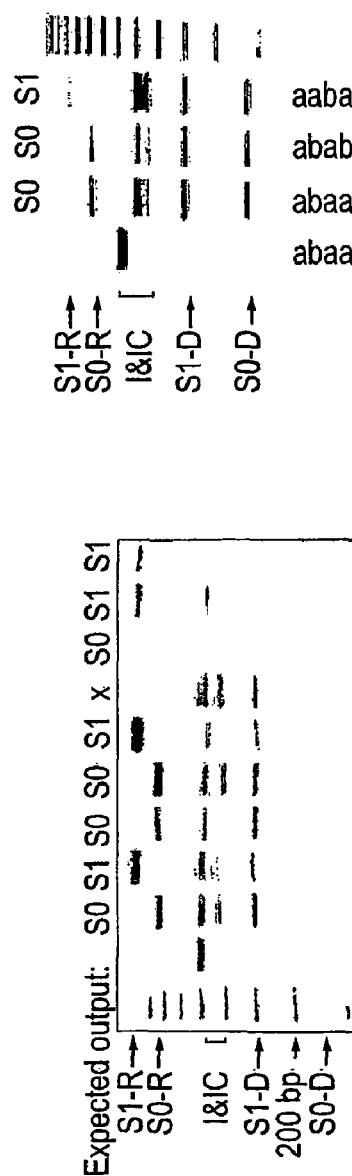
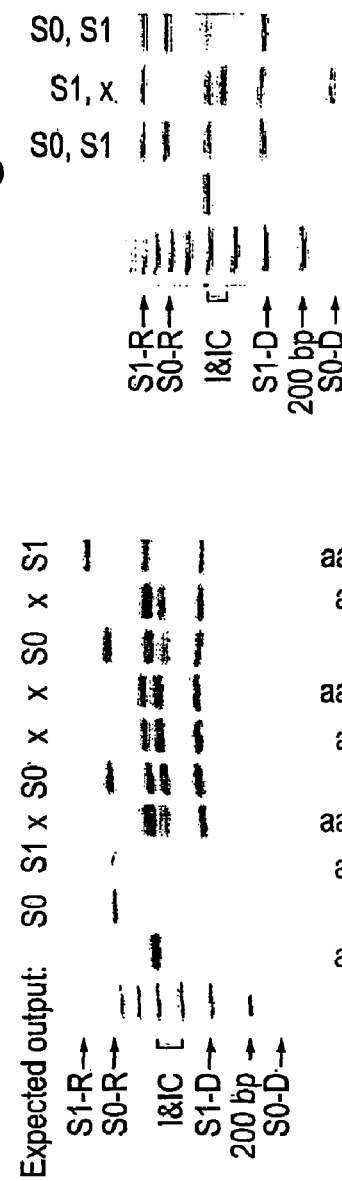
Fig. 3a
Fig. 3b
Fig. 3c
Fig. 3d

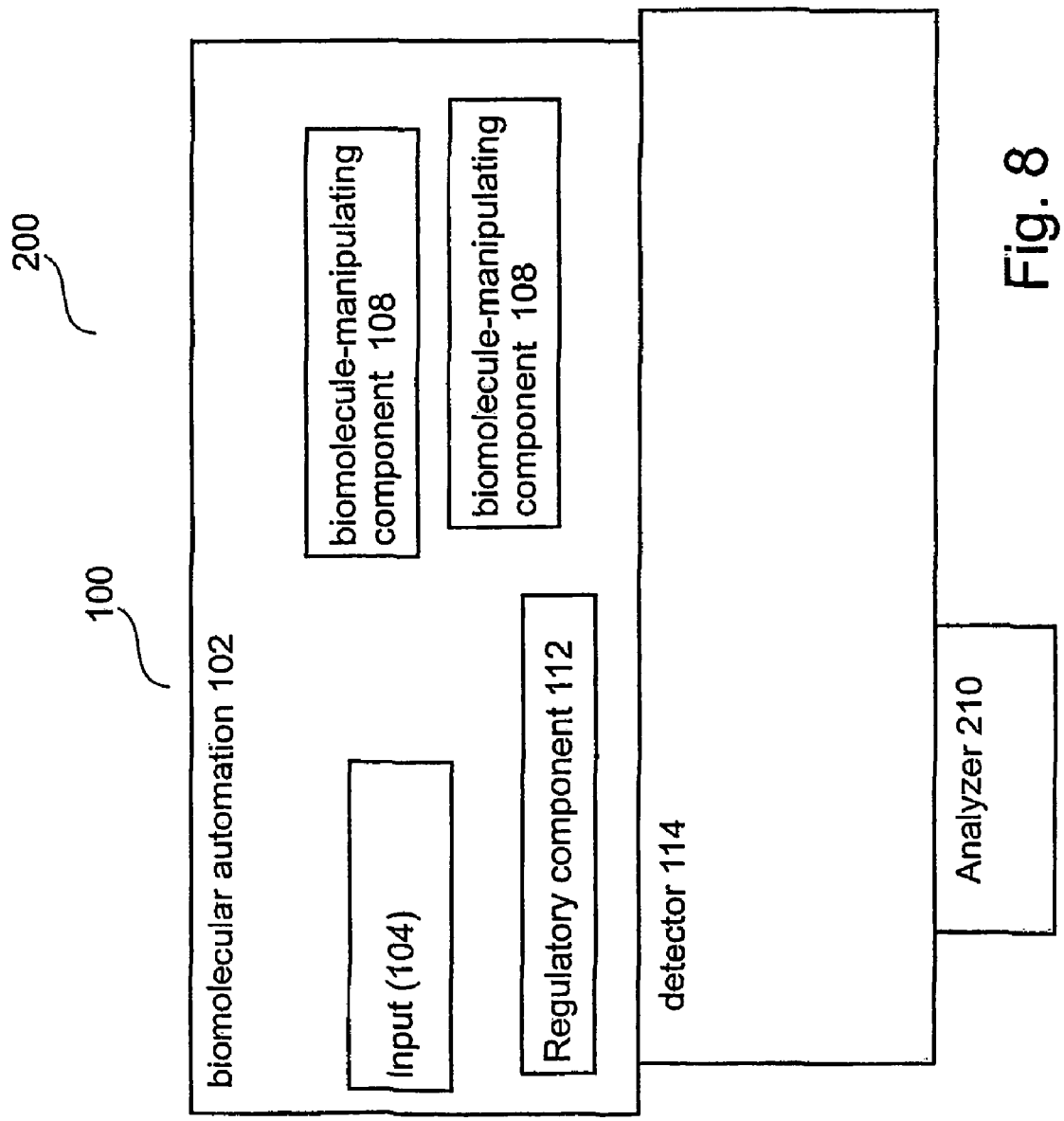

US 7,970,547 B2

PROGRAMMABLE AND AUTONOMOUS COMPUTING MACHINE MADE OF BIOMOLECULES

RELATED PATENT APPLICATION

This application is a National Phase Application of PCT/IL02/00915 International Filing Date 14 Nov. 2002, which claims priority from U.S. Provisional Patent Application No. 60/331,318 filed 14 Nov. 2001, and U.S. Provisional Patent Application No. 60/386,418 filed 7 Jun. 2002.

A Sequence Listing as required for compliance with 37 CFR 1.821(a)(1) and (a)(2), and as provided in a paper format listing and on a compact disc, is hereby incorporated by reference as if fully set forth herein. The compact disc includes a single file, called "304 seq listing txt", created on May 15, 2008, with a size of 4096 bytes, in the ASCII text format as required.

FIELD OF THE INVENTION

The present invention is of a device, system and method for performing computations through the manipulation of molecules, and in particular, for such a device, system and method in which power is provided from the input molecules, such as DNA molecules for example.

BACKGROUND OF THE INVENTION

Devices that convert information from one form into another according to a definite procedure are known as automata. One such hypothetical device is the universal Turing machine, which stimulated work leading to the development of modern computers. The Turing machine and its special cases, including finite automata, operate by scanning a data tape, whose striking analogy to information-encoding biopolymers inspired several designs for molecular DNA computers. Laboratory-scale computing using DNA and human-assisted protocols has been demonstrated, but the realization of computing devices operating autonomously on the molecular scale remains rare.

A Turing machine consists of an infinite storage tape divided into tape cells, each of which is capable of storing a single symbol, and a read/write head connecting the tape to a finite control. The machine operates according to a control program, consisting of a finite number of state-transition rules, which are quintuples of the form <S,A,S',A',Dir>. Such a rule is interpreted as follows: If the finite control is in state S, and the tape cell of the read/write head contains the symbol A, then change the control state to S', replace the symbol A by A', and move the read/write head by one cell in direction Dir (Dir is either "left" or "right"). The Turing machine begins its operation with a finite input written on the otherwise blank tape, the read/write head located on the left-most non-blank symbol, and the control in a designated initial state. The computation progresses according to the control program, and terminates when no State-transition rule applies. The content of the non-blank part of tape upon termination is considered the output of the computation.

In the 1970's, Charles Bennett performed a theoretical investigation of physical computation devices based on the Turing machine model. Bennett was motivated by the observation that the standard electronic computers are inherently energy-inefficient since their basic "store to memory" operation irreversibly erases the content of the memory location. Bennett believed that due to thermodynamic considerations computation devices that proceed in a reversible way would be more efficient, and he proposed two conceptual implementations of the Turing machine model that are reversible. One of these conceptual implementations was called a "Brownian computer" since its operation was based on the Brownian motion of molecules. In Bennett's Brownian computer, named "hypothetical enzymatic Turing machine", the tape is a macromolecule consisting of a structural backbone bearing tape symbols and a head marker, and each quintuple of the control program is realized by a specific enzyme that effects the transition by removing and adding a tape symbol, and moving the location of the head marker [1]. [Reference: Charles, H. Bennett, The Thermodynamics of Computation—A Review, International Journal of Theoretical Physics, Vol. 21, No. 12, 1982, pp.905-940].

More recently, interest in molecular computation devices resumed following the work of Adelman [15] [Leonard M. Adelman, Molecular computation of solutions to combinatorial problems, Science, 266:1021-1024, 1994] in 1994, which showed how DNA segments combined with DNA related enzymes can be used to effect computations. Adelman's method was based on creating a test-tube solution consisting of DNA segments and performing "biological steps", effected by a human or a robot, which include adding certain enzymes to the solution, dividing the solution into several tubes, and/or changing the temperature of the solution. At the end of these steps the result of the computation is extracted via standard biological tools.

Following that paper numerous proposals were made on how to implement a DNA-based Turing machine using DNA and related enzymes [see 39]. These proposals fall into two broad classes: one class requires each step of the computation to be effected by a "biological step" as in Adelman's method. The second class [40] creates a set of molecules that "self-assemble" in a way that effects a computation. Also, U.S. Pat. No. 6,266,569, hereby incorporated by reference [29] as if fully set forth herein, describes a molecular Turing machine. However, all of these conceptions of a molecular computing machine focus on Turing machines, rather than finite automata, and also cannot operate completely autonomously.

A finite automaton [26] is a notional computing machine that operates on finite sequences of symbols. The machine can be in one of a finite number of internal states, of which one is designated an initial state and some are designated accepting states. Its software consists of transition rules, each specifying a next state based on the current state and the current symbol. It is initially positioned on the leftmost input symbol in the initial state. In each transition the machine moves one symbol to the right, changing its internal state according to one of the applicable transition rules. Alternatively, it may 'suspend' without completing the computation if no transition rule applies. A computation terminates on processing the last input symbol. An automaton is said to accept an input if a computation on this input terminates in an accepting final state.

Another unresolved question for molecular computing is the source of power for the computer. Such a question may be solved in the laboratory by continuously adding an external fuel source. However, if the concept of molecular computing is to eventually become practically applicable to actual computational devices, then the issue of power sources must be resolved.

Simple mathematical computing machines such as finite automata [13, 14] (FIG. 1) scan their input once to produce an output and therefore could destroy the input while scanning without disrupting the computation. One hypothetical way to obtain energy from input destruction, proposed by Bennett [1], is to replace each scanned input symbol by a random symbol. Information destruction by randomization can only extract energy from a non-random input, as randomizing an already random input does not increase entropy [1,2]. Furthermore, it is not clear how this method can be realized in practice. Another approach is to destroy the input structure while preserving the input symbols, effectively turning the sequence of symbols into an unordered collection, the way nucleases digest information-carrying biopolymers while preserving the nucleotides that form them.

Any computation can be accomplished, theoretically, with arbitrarily little energy [1]. Hence if the free energy of the computer's input is higher than that of its output, the computer can, in principle, use the energy difference to accomplish the computation at the expense of input destruction [1, 2]. There is no obvious way to exploit this principle in electronic computers, even in the case of yes/no questions where the output consists of a single bit, and past research on energy-efficient computing focused on reversible computers that avoid information destruction [1-11]. Living systems, in contrast, package information in metastable polymers such as DNA, RNA and proteins [12], the decomposition of which via hydrolysis dissipates heat and increases entropy. This system design inhibits the formation of unwanted random information and facilitates discarding dated, erroneous or hostile information and recycling its constituent bits, rendering the cell an efficient information-processing device.

Currently, the issue of power consumption, power replacement and fuel sources has not been addressed, let alone resolved, for molecular computing machines.

SUMMARY OF THE INVENTION

The background art does not teach or suggest a biomolecular computing device that is a programmable finite automaton. The background art does not teach or suggest a molecular computing device that has a suitable, replaceable power source. The background art also does not teach or suggest a suitable mechanism for providing power to molecular computers. Also, the background art does not teach or suggest such a biomolecular computing device that operates autonomously on polymeric biomolecules.

The present invention overcomes these deficiencies of the background art by providing a device, system and method for a programmable finite automaton comprising a biomolecule, such as DNA, and associated biomolecule-manipulating enzymes, that solves computational problems autonomously. The preferred but non-limiting, illustrative example of a biomolecule for the present invention is a polynucleotide, such as DNA for example. For this preferred example, the hardware of the automaton preferably includes biomolecule-manipulating enzymes, such as restriction nuclease(s) and ligase(s), the software and input are preferably encoded by double-stranded DNA, and programming is preferably performed by choosing appropriate software DNA molecules. Upon mixing solutions containing these components, the automaton processes the input molecule. For the preferred embodiment of the present invention, such processing is performed through a cascade of restriction, hybridization and ligation cycles, producing a detectable output molecule that encodes the final state of the automaton, and thus the computational result.

According to the exemplary implementation of the present invention, described in greater detail below, $10^{12}$ automata sharing the same software are capable of being operated independently and in parallel on inputs (which could, in principle, be distinct) in 120 µl solution at room temperature at a combined rate of $10^9$ transitions per second with a transition fidelity greater than 99.8%, consuming less than $10^{-10}$ W.

According to a preferred embodiment of the present invention, there is provided a device, system and method for molecular computing, which not only includes a suitable, renewable power source, but actually is able to receive power through the performance of the computations themselves. The molecular computing machine of the present invention actually employs the free-energy difference between its input and output to accomplish a computation, preferably by using its input DNA molecule as a partial source of energy, or alternatively by using the input DNA molecule as the sole source of energy. This molecular finite automaton [13, 14] preferably transforms an input DNA molecule into an output DNA molecule by digesting the input as it computes.

This preferred embodiment of an automaton is optionally and preferably configured so that it does not require energy-consuming ligation. Also preferably, this automaton (molecular computing device) does not consume its software during computation, hence a fixed amount of software and hardware molecules can optionally process any input molecule of any length. The experiments described below demonstrate that $3 \times 10^{12}$ automata/microliter performing $6.6 \times 10^{10}$ transitions/sec/microliter with transition fidelity of 99.9%, dissipating $5 \times 10^{-9}$ W/microliter as heat at ambient temperature.

Hereinafter, the term "substantially similar biomolecule" is defined as a biomolecule of the same type, such as a polynucleotide for example, as the type of biomolecule with which the comparison is being made.

It should be noted that the term "polymeric biomolecule" may optionally refer to any biomolecule comprised of a plurality of linked monomers, including but not limited to, polynucleotides, peptides (comprised of a plurality of amino acids), polysaccharides, any other suitable biological polymer and combinations thereof.

Although the present invention is described with regard to DNA as the exemplary biomolecule, substantially any type of polymer may optionally be employed with the present invention. Illustrative examples include, but are not limited to, RNA and any type of substituted DNA and/or RNA polymer. By "substituted" it is meant any DNA and/or RNA polymer containing at least one nucleotide analog, as described in greater detail below.

For the exemplary but preferred embodiment with DNA and/or RNA as the biomolecule, any type of biomolecule-manipulating component may optionally be used that is known in the art. Examples of such biomolecule-manipulating components include but are not limited to, enzymes and chemical reactions involving the biomolecule and one or more additional molecule(s). Examples of suitable enzymes include, but are not limited to, polymerases, ligases, recombinases, topoisomerases, helicases and nucleases.

Examples of polymerases include but are not limited to, template-dependent polymerases.

As used herein in the specification and in the claims section that follows, the phrase "template-dependent polymerase" refers to one or more of a structurally diverse group of nucleotidyl-transferase enzymes that catalyze template-dependent extension of nucleic acid polymers, including DNA-dependent DNA polymerases (E.C. 2.7.7.7), DNA-dependent RNA polymerases (E.C. 2.7.7.6), RNA-dependent DNA polymerases (E.C. 2.7.7.49), and RNA-dependent RNA polymerase (E.C. 2.7.7.48). Non-limiting examples of widely employed template-dependent polymerases include T7 DNA polymerase of the phage T7 and T3 DNA polymerase of the phage T3 which are DNA-dependent DNA polymerases, T7 RNA polymerase of the phage T7 and T3 RNA polymerase of the phage T3 which are DNA-dependent RNA polymerases, DNA polymerase I or its fragment known as Klenow fragment of *Escherichia coli* which is a DNA-dependent DNA polymerase, *Thermophilus aquaticus* DNA polymeiase, Tth DNA polymerase and vent DNA polymerase, which are thermostable DNA-dependent DNA polymerases, eukaryotic DNA polymerase β, which is a DNA-dependent DNA polymerase, telomerase which is a RNA-dependent DNA polymerase, and non-protein catalytic molecules such as modified RNA (ribozymes) and DNA with template-dependent polymerase activity.

As used herein in the specifications and in the claims section that follows, the term "nucleotide analog" includes nucleotides that are chemically modified in the natural base (hereinafter "base analogs"), in the natural sugar (hereinafter "sugar analogs"), and/or in the natural phosphodiester or any other internucleosidyl linkage (hereinafter "internucleosidyl linkage analogs").

The nucleotide analogs of the invention may bear at least one functional group selected from: (i) a chemically-reactive group being a group involved in formation or cleavage of any form of a chemical interaction involving electron, proton, or charge transfer including, but not being limited to, a nucleophile, a hydrogen-bond donor, a hydrogen-bond acceptor, an acid, a base, a charged moiety, a hydrophilic moiety, a metal ligand, and a leaving group; (ii) a chemically-inert group being a group involved in interactions that have no electron, proton, or charge transfer, but that may have a structural role, including, but not being limited to, a hydrophobic moiety; (iii) a cross-linking group; (iv) a labeling group, and (v) a first binding-group of a binding pair, which are related to each other by specific binding affinity.

The functional group as above may be linked directly to the base, sugar, or internucleosidyl linkage, or through a spacer, so as to reduce steric hindrance that may interfere with binding to the polymerase and/or with pairing to the template.

It will be appreciated that a variety of functional groups have been successfully bound to nucleotides. It will further be appreciated that such binding did not hamper the ability of template-dependent polymerases to employ nucleotides derivatized by such functional groups as building blocks for template-dependent nucleic acid synthesis.

Examples of base analogs that can be used according to the invention include, but are not limited to, modified purine and pyrimidine bases such as, for example, O-methyl, C-methyl, N-methyl, deaza, aza, halo (F, Br, I), thio, oxo, aminopropenyl, amino, acyl, propynyl, pentynyl, and etheno base derivatives, as well as more drastic modifications such as replacement of the base by phenyl and even complete deletion of the base (abasic), and additional analogs.

Examples of sugar analogs that can be used according to the invention include, but are not limited to, modifications of the β-ribofuranosyl and β-2'-deoxyribofuranosyl sugar residues such as, for example, 2'-O-methyl, 2'-O-allyl, 2'-O-amino, 2'-deoxy-2'-halo (F. Cl, Br, I), 2'-deoxy-2'-thio, 2'-deoxy-2'-amino and dideoxy derivatives, as well as corresponding α-anomers and hexose analogs, and additional analogs.

Examples of internucleosidyl analogs that can be used according to the invention include, but are not limited to, those in which the natural phosphodiester linkage is replaced by a linkage such as phosphorothioate, phosphorodithioate, phosphoroamidate, methylphosphonate, and additional analogs.

Also, peptide nucleic acids (PNA) can optionally be used, in which the entire phosphate-sugar backbone is replaced with a backbone consisting of (2-aminoethyl) glycine units to which bases are attached through methylenecarbonyl bridges.

Examples of nucleases include but are not limited to endonucleases and exonucleases. Examples of endonucleases include but are not limited to, restriction enzymes and nickases.

Illustrative, non-limiting examples of specific restriction enzymes which are operable with the present invention include AatII, AccI, AflII, AflIII, AhaII, AluI, AlwI, AlwNI, ApaI, ApaLI, AseI, Asp718, AvaI, AvaII, AvrII, BalI, BamHI, BanL, BanII, BbeI, BbvI, BbvII, BclI, BcnI, BglI, BglII, BseRIBsmI, BsrrAI, Bsp12861, BspHI, BspMI, BspMII, BsrI, BssHII, BstBI, BstEII, BstNI, BstUI, BstXI, BstYI, Bsu36I, Cfr10I, ClaI, DdeI, DpnI, DraI, DraIII, EaeI, EagI, EarI, Eco47III, EcoNI, EcoO1091, EcORI, EcORII, EcORV, EspI, Fnu4HI, FokI, FspI, GdiII, HaeI, HaeII, HaeIII, HgaI, HgiAI, HhaI, HinCII, HinDIII, HinfI, HinPI, HpaI, HpaII, HphI, KpnI, MaeI, MaeII, MaeIII, MboI, MboII, MluI, MnlI, MseI, MspI, NaeI, NarI, NciI, NcoI, NdeI, NheI, NlaIII, NlaIV, NotI, NruI, NsiI, Nsp75241, NspBII, NspHI, PaeR71, PflMI, PleI, PpuMI, PstI, PvuI, PvuII, RsaI, RsrII, SacI, SacII, SalI, Sau3AI, Sau96I, ScaI, ScrFL, SecI, SfaNI, SfiI, SmaI, SnaBI, SpeI, SphII, SptI, SspI, StuI, StyI, TaqI, Tth111I, Tth111I, XbaI, XcaI, XhoI, XmaI, XmnI.

Examples of ligases include but are not limited to, DNA ligase from the T4 bacteriophage (T4 DNA ligase), which requires ATP as a cofactor; DNA ligase from *E. coli* which requires NAD as a cofactor, or Taq DNA ligase, which also requires NAD; and chemical ligation of DNA termini.

BRIEF DESCRIPTION OF THE DRAWINGS

The invention is herein described, by way of example olily, with reference to the accompanying drawings, wherein.

Figure 1:
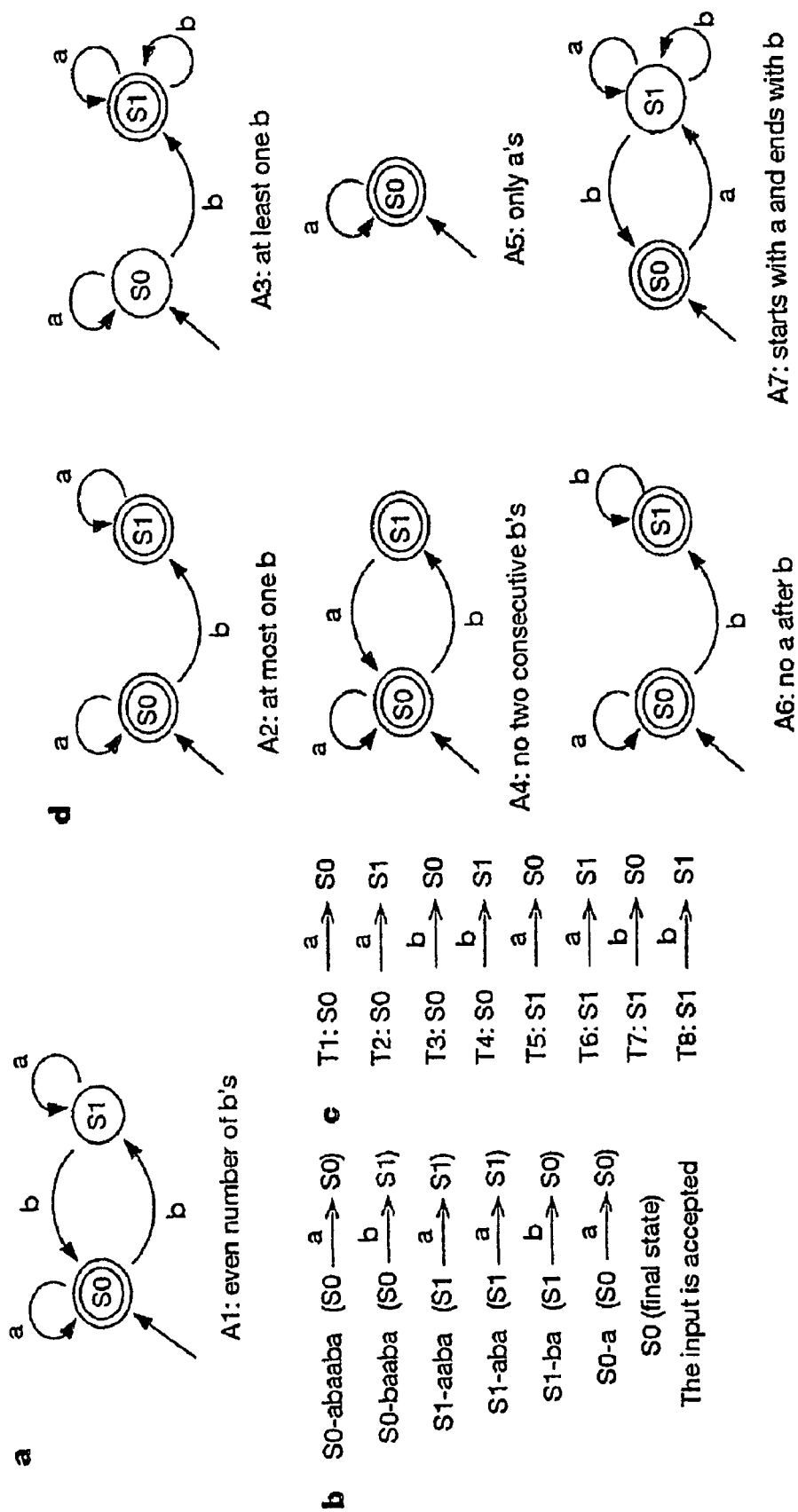
FIGS. 1-1 and 1-2 show two exemplary finite automata with two states (S0 and S1) and two symbols (a and b). For FIG. 1-1: a, Diagram representing the automaton A1 accepting inputs with an even number of b symbols. Incoming unlabelled arrow represents the initial state, labeled arrows represent transition rules, and the double circle represents an accepting state. b, An example computation over abaaba. Each row represents an intermediate configuration, showing the current state of the automaton and the remaining symbols to be processed. The transition rule taking a configuration to its successor is shown on the right. c, A list of an eight possible transition rules of a two-state two-symbol automaton. d, Six other automata programs used to test the molecular implementation and the sets of inputs they accept. Non-deterministic automaton A7 has two transitions T7 and T8 applicable to the same configuration. A computation of A7 ending in an accepting state uses T8 for all b symbols except the last, and uses T7 for the last b.
Figures 1, 2:
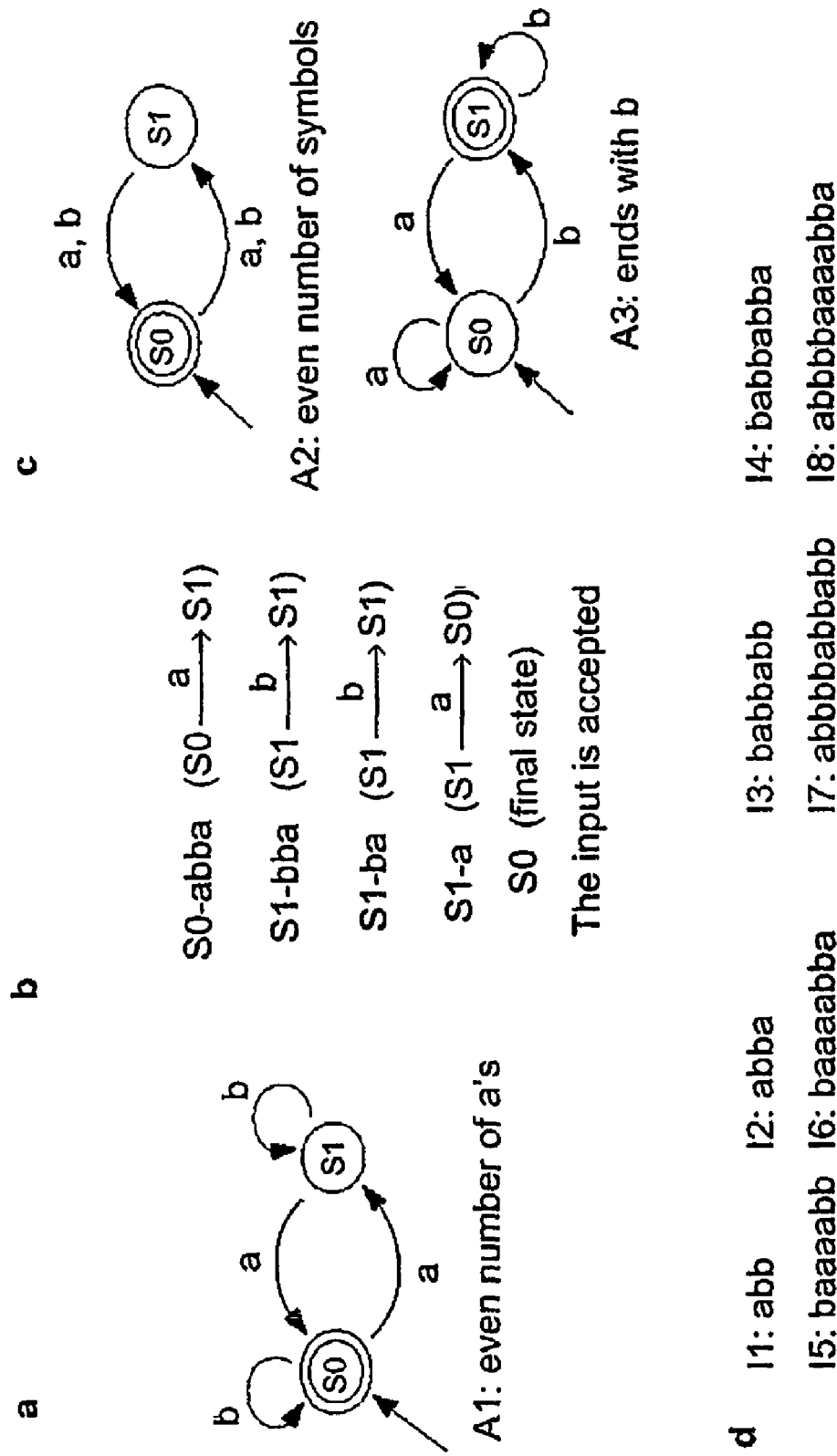
Figure 2:
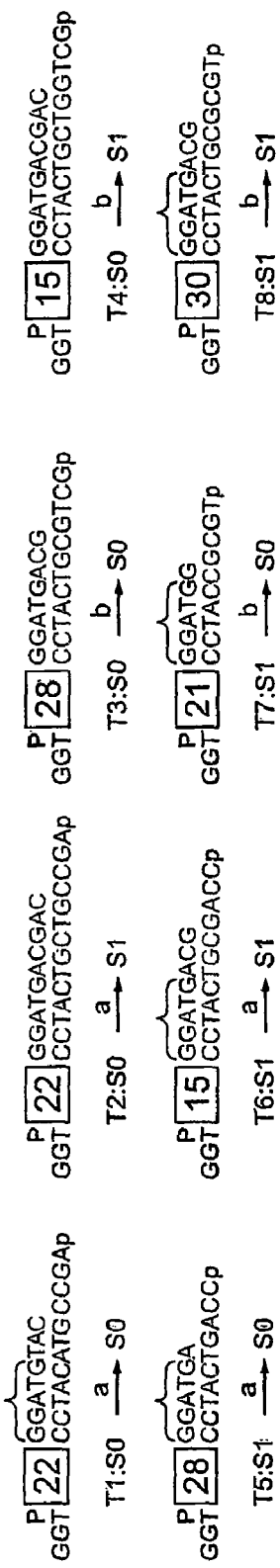
Figure 2:
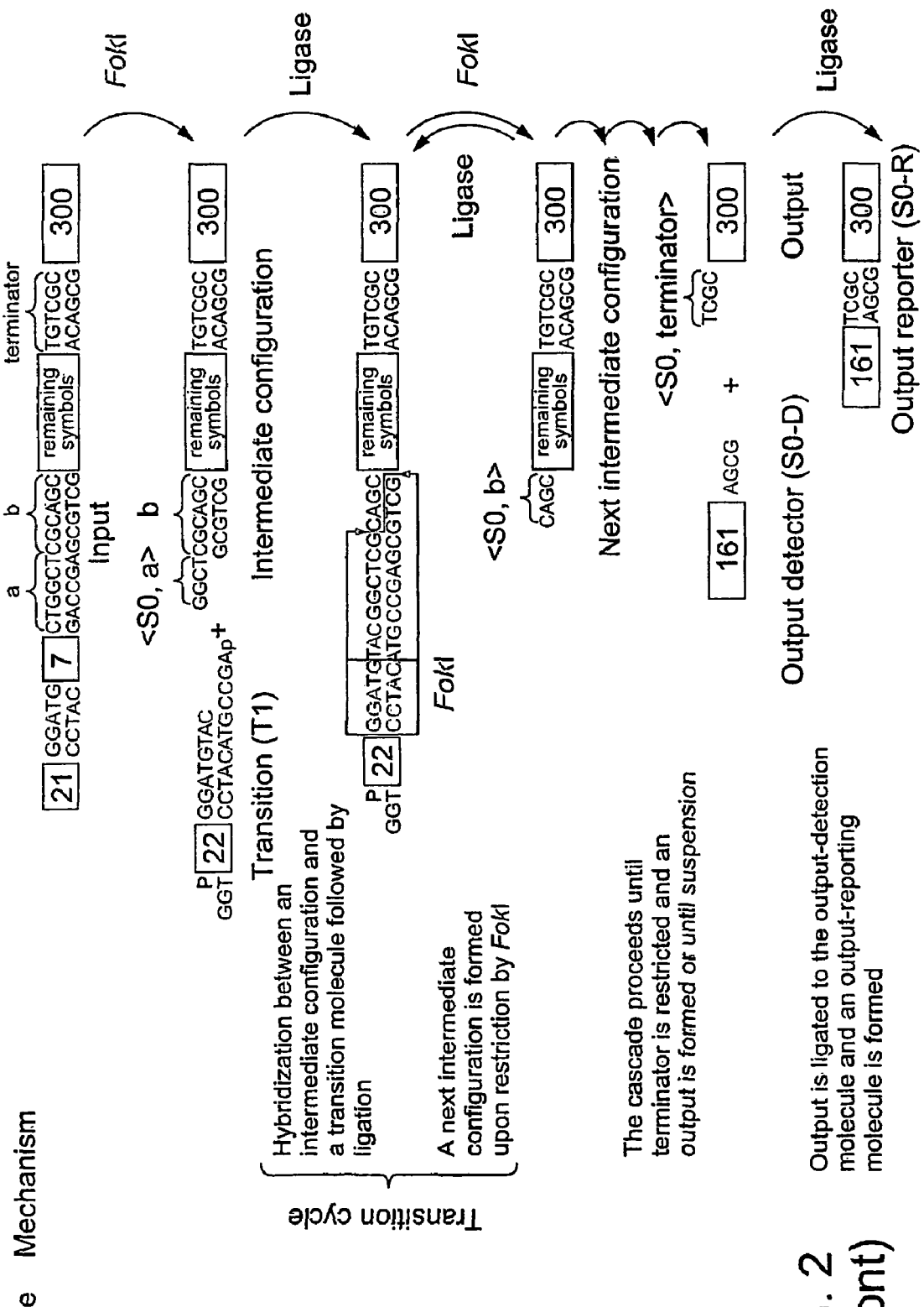

For FIG. 1-2: A: Automaton A1, accepting input with even number of a's. The automaton has two states S0 and S1 and accepts input sequences containing the symbols a and b with an even number of a's. Incoming unlabelled arrow marks the initial state, and labeled arrows represent transition rules, each specifying a next state based on the current state and the current symbol. A double circle represents an accepting state. B: A computation of A1 scanning and digesting the input abba. An automaton is initially positioned on the leftmost input symbol in the initial state and in each transition cleaves one symbol, changing its state according to an applicable transition rule, or 'suspending' if no transition rule applies. Each row represents an intermediate configuration showing current state and remaining input. The transition rule applied is shown on the right. A computation terminates upon processing the last input symbol. An automaton is said to accept an input if a computation on this input terminates in an accepting final state. C: The two other automata with a demonstrated molecular operation. D: The set of inputs that are used as fuel;

FIG. 2 shows design details and mechanism of operation of an optional but preferred embodiment of a molecular finite automaton according to the present invention, as described with regard to FIG. 1-1. a, Structure of the transition molecules. A transition molecule detects the current state and symbol and determines the next state. It consists of (state, symbol) detector, FokI recognition site, and spacer that determines the location of the FokI cleavage site inside the next symbol encoding, which in turn defines a next state. 1-bp spacers effect S1 to S0 transition, 3-bp maintain the current state, and 5-bp transfer S0 to S1. Sequence identifiers for top row by pair: First pair-none, SEQ ID NO.1; Second pair-SEQ ID NOs. 2 and 3; Third pair-none, SEQ ID NO. 4; Fourth pair-SEQ ID NOs. 2 and 5. Bottom row by pair: First pair-none, SEQ ID NO. 6; Second pair-SEQ ID NOs. 5 and 7; Third pair-none, SEQ ID NO. 8; Fourth pair-none, SEQ ID NO. 9. b, Structure of an input molecule. Sequence identifier for top sequence: SEQ ID NO. 10. Sequence identifier for bottom sequence: SEQ ID NO. 11. c, The encoding for the input symbols a, b, and terminator (sense strands) and the sequences of the (state, symbol) sticky ends. d, Structure of the output-detection molecules. e, A sample processing of an input molecule beginning with ab. The S0 →$^a$ S0 rule is applied to the first intermediate configuration molecule. The detection is illustrated for S0 output. Sequence identifiers for top pair: SEQ ID NOs. 10 and 11. Sequence identifiers for second row, left hand pair: none, SEQ ID NO. 1. Sequence identifiers for second row, right hand pair: SEQ ID NO. 12, none. Sequence identifiers for third row: SEQ ID NOs. 13 and 14.

Figure 5:
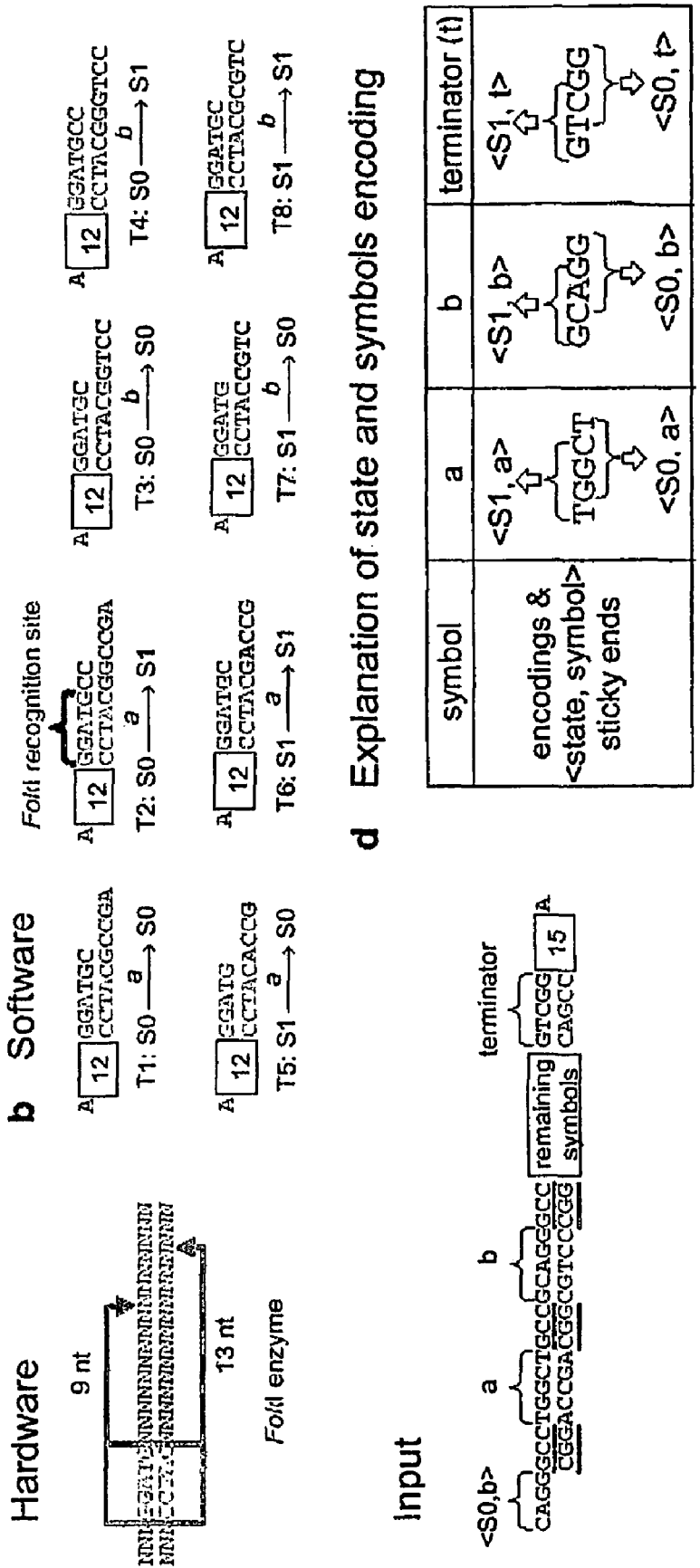
Figure 5:
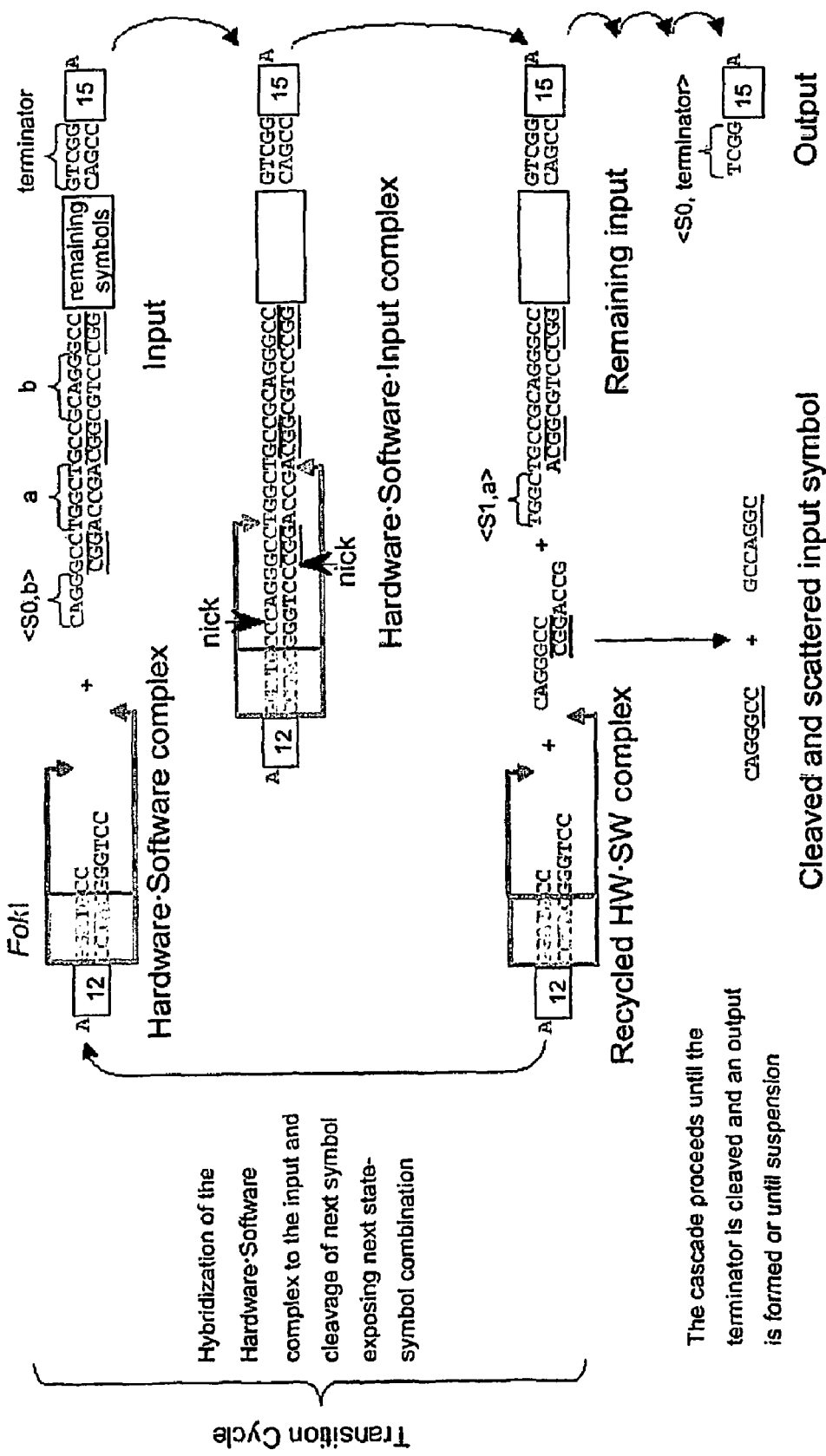
Figure 6:
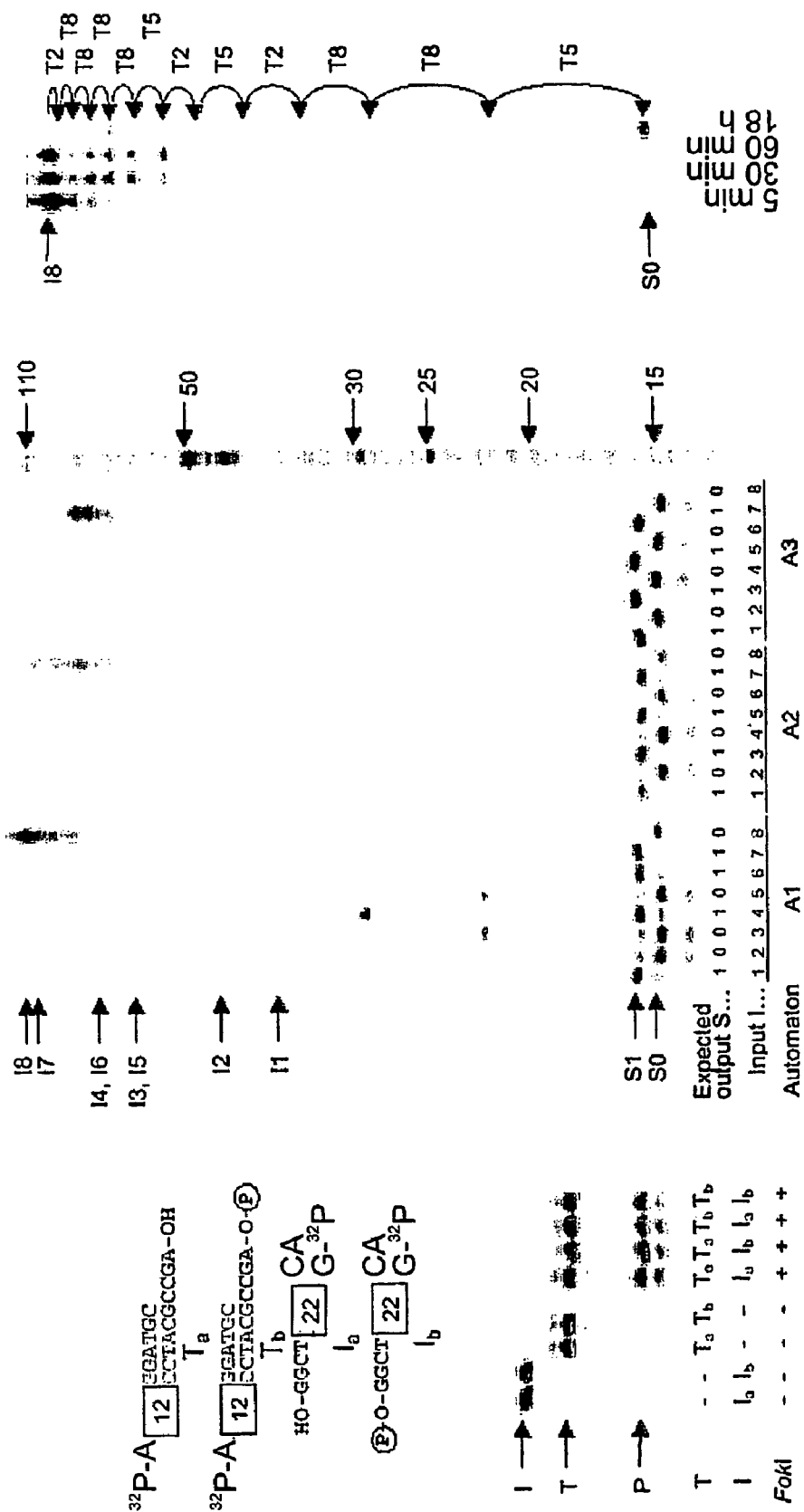
Figure 7:
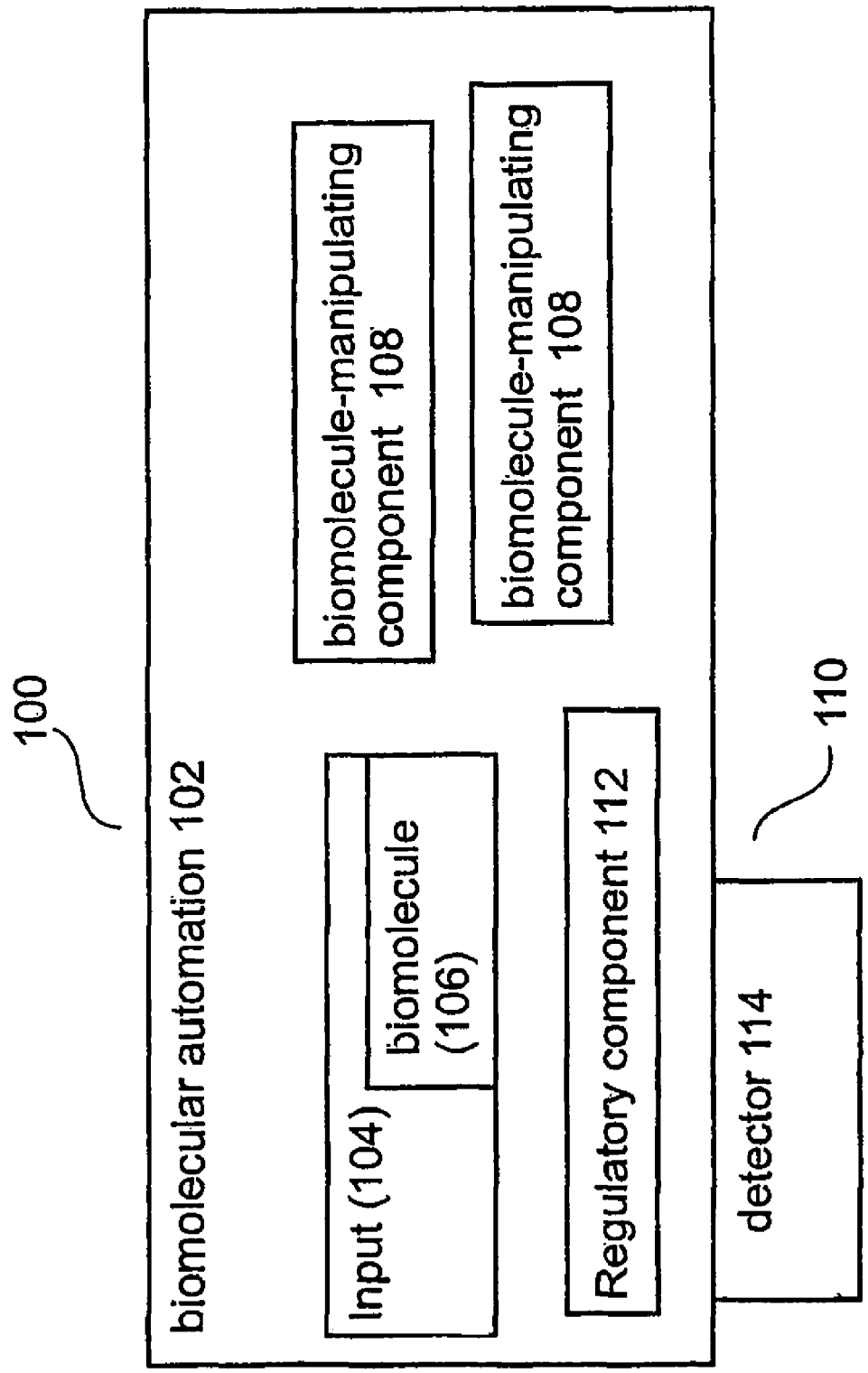

FIG. 3 shows the results of operating the exemplary molecular finite automaton according to the present invention as described in FIG. 1-1. a, Experimental testing of automaton programs A1-A6 (FIGS. 1-1$a$ and $d$). The molecules in each lane are the output-detection molecules S0-D and S1-D, molecules encoding intermediate configurations capped by yet-to-be-processed input molecules and followed by output-reporting molecules S0-R or S1-R, which are missing in case the computation suspends (for example, A2, 'at most one b', suspends on aabb). Expected locations of different species and a size marker of 200 bp are indicated by arrows to the left. Input molecules are specified below each lane, and expected outputs (S0, S1 or suspension (x)) are indicated above each lane. Reactions with the same software are grouped in triplets, the software indicated below. I&IC, input and intermediate configurations. b, Computations with A1 software performed over 6-symbol-long input molecules. All inputs are of the same size, shown on a reference lane. c, Parallel computation. Input mixture composition and the software used are indicated below the lanes. d, Demonstration of a non-deterministic computation;

FIG. 4 shows verification of the operation mechanism of the exemplary automaton according to the present invention as described in FIG. 1-1. a, Identification of the essential components. Each lane is a computation reaction with one component omitted (above). The ligase or ATP-free reactions were identical and are represented by one lane. b, Close inspection of the reaction intermediates analyzed by native PAGE (5%). Sample composition is indicated above the gel image. The ababaa lane contains labeled input. 'All components' lane is an output-detectors-free A1 computation, performed for reference. All other lanes lack the indicated components. The size markers are indicated to the left. c, An estimation of system fidelity analyzed by native PAGE (6%). The composition of different lanes is as follows: 1, pure labeled S0-D; 2, pure labeled S1-D; 3, input-free computation reaction; 4, pure labeled ababaa; 5, pure labeled aabaaa; 6, a computation reaction over ababaa with unlabelled input and labeled output-detection molecules; 7, a similar reaction over aabaaa. Locations of the different components and the size markers of 200 bp and 300 bp are indicated on the left;

FIG. 5 shows a molecular finite automaton that uses information as fuel, as described with regard to FIG. 1-2. A: Hardware: The FokI restriction enzyme, which recognizes the sequence GGATG and cleaves 9 and 13 nucleotides apart on the 5'→3' and 3'→5' strands, respectively. B: Software: Each DNA molecule realizes a different transition rule by detecting a current state and symbol and determining a next state. It consists of a detector, a FokI recognition site and a spacer of variable length that determines the FokI cleavage site inside the next symbol, which in turn defines the next state. Empty spacers effect S1 to S0 transition, single basepair (bp) spacers maintain the current state, and 2-bp spacers transfer S0 to S1. Sequence identifiers for top row by pair: First pair-none, SEQ ID NO. 15; Second pair-none, SEQ ID NO. 16; Third pair-none, SEQ ID NO. 17; Fourth pair-none, SEQ ID NO. 18. Sequence identifiers for bottom row by pair: First pair-none, none; Second Sequence identifiers for top row by pair: First pair-none, SEQ ID NO. 19; Third pair-none, none; Fourth Sequence identifiers for top row by pair: First pair-none, SEQ ID NO. 20. C: Input: The exposed sticky end at the 5'-terminus of the DNA molecule encodes the initial state and first symbol. Each symbol is encoded with five base pairs separated by 3-bp spacers. Sequence identifiers-SEQ ID NOs. 21 and 22. D: Encoding of a, b, and terminator (sense strands) and the <state,symbol> interpretation of exposed 4-nucleotide sticky ends [16], the leftmost representing the current symbol and the state S1, similarly the rightmost for S0. E: The computation proceeds via a cascade of transition cycles, each cleaving and scattering one input symbol, exemplified with the input molecule bab in the initial state S0 and the transition 1. Sequence identifiers for top row-left hand pair-none, SEQ ID NO. 18; right hand pair-SEQ ID NOs. 21 and 22. Sequence identifiers for second row-SEQ ID NOs. 25 and 26. Sequence identifiers for third row-left hand pair-none, SEQ ID NO. 27; right hand pair-SEQ ID NOs. 23 and 24 Both hardware and software molecules are recycled;

FIG. 6 shows experimental results and mechanism analysis of the molecular automaton from FIG. 5 A: A demonstration that a single computational step does not require Ligase. Different variants of the software molecule (T.sub.a, non-phosphorylated, and T.sub.b, phosphoiylated) and the input (I.sub.a, non-phosphorylated and I.sub.b, phosphorylated) were reacted with the hardware (FokI). Input, software and hardware concentrations were all 1 micromolar. The reactions were incubated at 8.degree. C. for 10 min. The components of each reaction are shown below the lanes and the locations of the software molecule (T), the input (I) and the product (P) are indicated by arrows. Sequence identifiers for top pair: none, SEQ ID NO. 15; Sequence identifiers for second pair: none, SEQ ID NO. 15. B: Executing automata A1-A3 (FIG. 1$a$, 1$c$) on inputs I1-I8 (FIG. 1$d$). Input, software and hardware concentrations were 1 micromolar, 4 micromolar and 4 micromolar, respectively. The reactions were set in 10 microliter and incubated at 8.degree. C. for 20 min. The molecules in each lane are the original inputs and the intermediate configurations followed by the output bands at indicated locations. The software sets, the inputs and the expected outputs are indicated below each lane. The locations of the unprocessed inputs are shown on the left. The size markers are indicated by arrows on the right. Labeling of the antisense strand of an input allows visualization of the antisense strand of the double-stranded output at the predicted location by this denaturing PAGE. C: A demonstration of the software reusability with the 4-transitions automaton A1 applied to the 12-symbols input I8 with each software molecule taken at 0.075 molar ratio to the input. Input, software and hardware concentrations were 1 micromolar, 0.3 micromolar (0.075 micromolar each kind) and 1 micromolar, respectively. After 18 hours, software molecules T2, T5 and T8 performed on the average 29, 21 and 54 transitions each. Locations of the input and output are indicated on the left, and the different intermediates and the software molecules applied at each step on the right;

FIG. 7 shows an exemplary device incorporating a biomolecular automaton according to the present invention; and FIG. 8 shows an exemplary system incorporating a biomolecular automaton according to the present invention.

DESCRIPTION OF THE PREFERRED EMBODIMENTS

The present invention is of a device, system and method for a programmable finite automaton comprising a biomolecule, such as DNA for example, and associated biomolecule-manipulating components, such as enzymes for example that solves computational problems autonomously. The preferred but non-limiting, illustrative example of a biomolecule for the present invention is a polynucleotide, such as DNA for example. For this preferred example, the hardware of the automaton preferably includes biomolecule-manipulating enzymes, such as restriction nuclease(s) and ligase(s), the software and input are preferably encoded by double-stranded DNA, and programming is preferably performed by choosing appropriate software molecules. Upon mixing solutions containing these components, the automaton processes the input molecule. For the preferred embodiment of the present invention, such processing is performed through a cascade of restriction, hybridization and ligation cycles, producing a detectable output molecule that encodes the final state of the automaton, and thus the computational result.

The present invention operates autonomously inasmuch as, unlike previous conceptions of molecular computing machines that use DNA, the finite automaton according to the present invention is capable of performing all processing without further outside intervention, until a final state of the automaton is reached. The present invention is programmable through the selection of one or more polymeric biomolecules, and also according to the combination of biomolecule-manipulating components and one or more selected biomolecules. If an additional biomolecule is present, other than the input, such an additional biomolecule may optionally be termed a transition molecule, as it provides a "transition rule" according to which a transition from one state to another state may occur for the input biomolecule.

The basic features and processes of a finite automaton with two internal states (S0 and S1) and an alphabet comprising two input symbols a and b are shown in FIG. 1-1. This exemplary automaton can optionally be realized as a biomolecular automaton according to the present invention, by being implemented for operation on a biomolecule. It should be noted that the present invention is operative with substantially any type of polymer, although preferably the polymer is composed of monomers with complementarity features similar to that of nucleotide bases, such as for DNA or RNA, or their analogs such as PNA, etc.

FIG. 1-1a shows a representation of the automaton A1 accepting inputs with an even number of b symbols. The incoming unlabelled arrow represents the initial state, labeled arrows represent transition rules, and the double circle represents an accepting state. FIG. 1-1b shows an exemplary computation with the illustrative input of abaaba. Each row represents an intermediate configuration, showing the current state of the automaton and the remaining symbols to be processed. The transition rule talding a configuration to its successor is shown on the right.

This exemplary automaton can have eight possible transition rules (T1-T8; FIG. 1-1c), and programming amounts to selecting some of these transition rules and deciding which internal states are accepting. There are 255 possible transition-rule selections and 3 possible selections of accepting states (either S0 or S1, or both), resulting in 765 syntactically distinct programs. A selection of such programs (A2-A7) is shown in FIG. 1-1d.

According to a preferred embodiment of the present invention, there is provided a molecular finite automaton that is optionally and preferably implemented with DNA as an optional but preferred example of a biomolecule. One of the advantages of implementation with DNA is that a large number of biomolecular-manipulating components are available. These include, but are not limited to, restriction enzymes and ligases (ligating enzymes). Within each large class, many subclasses are also optionally possible to use with the present invention.

As a non-limiting example of an illustrative biomolecular automaton, it is possible to implement the "hardware" or biomolecular-manipulating components of the automaton with a mixture of the class IIS restriction nuclease FokI, T4 DNA ligase and ATP. The "software" or operational control component(s) may optionally comprise eight short double-stranded (ds) DNA molecules, the 'transition molecules' which encode the eight possible transition rules (from the example of FIG. 1-1c), as described in greater detail below. Of course, a greater or lesser number of transition rules may optionally be implemented.

A dsDNA (double stranded DNA) molecule preferably encodes the initial state of the automaton and the input, with a plurality of base pairs (bp) coding for each input symbol. It should be noted that optionally, the same polymeric biomolecule, such as a DNA molecule for example, comprises the input as well as the software. Alternatively and more preferably, as previously described and also as described in greater detail below, the software may optionally comprise one or more additional polymeric biomolecules.

The system may also optionally and preferably contain one or more 'peripherals', each of which comprises at least one, but preferably two or more, output-detection molecules of different lengths, each of which can interact selectively with a different output molecule to form an output-reporting molecule that indicates a final state. Such output-detection molecules optionally and more preferably can be readily detected by gel electrophoresis or any other optional type of detector. Each output-detection molecule may optionally be labeled with a detectable label, such as a radioactive label, a colorometric label, a magnetic or paramagnetic label, or a fluorescent label, for example. Such labels are well known in the art, and their use to label biomolecules, such as DNA molecules for example, is also well known in the art and could easily be performed by one of ordinary skill in the art.

The computation starts when the hardware, software and input are all mixed together and runs autonomously, if possible until termination. If the peripherals are also mixed then output reporters are preferably formed ill situ on termination, or otherwise are able to report the output to a detector of some type.

The automaton preferably processes the input through a series of cleavages and ligations, to obtain the final product. The computation optionally and preferably proceeds via a cascade of transition cycles. In each cycle the sticky end of an applicable transition molecule preferably ligates to the sticky end of the input molecule, detecting the current state and the current symbol. The product is cleaved by FokI inside the next symbol encoding, exposing a new four-nucleotide sticky end. The design of the transition molecules ensures that the 6-bp-long encodings of the input symbols a and b are cleaved by FokI at only two different 'frames' [16], the leftmost frame encoding the state S1 and the rightmost frame encoding S0 (FIG. 2c). The exact next restriction site and thus the next internal state are determined by the current state and the size of the spacers (FIG. 2a, green) in an applicable transition molecule. The computation proceeds until no transition molecule matches the exposed sticky end of the input or until the special terminator symbol is cleaved, forming an output molecule that has a sticky end encoding the final state. In a step extraneous to the computation and analogous to a 'print' instruction of a conventional computer, this sticky end ligates to one of two output detectors and the resultant output reporter is identified by gel electrophoresis.

According to a preferred embodiment of the present invention, there is provided a device, system and method for molecular computing, which not only includes a suitable, renewable power source, but actually is able to receive power through the performance of the computations themselves. The molecular computing machine of the present invention actually optionally and preferably employs the free-energy difference between its input and output to accomplish a computation, preferably by using its input DNA molecule as a partial source of energy, or alternatively by using the input DNA molecule as the sole source of energy. This molecular finite automaton preferably transforms an input DNA molecule into an output DNA molecule by digesting the input as it computes. Optionally and more preferably, the molecular computing device of the present invention operates without ligation, which consumes a great deal of energy, and is therefore "energy expensive".

An exemplary but preferred embodiment of the present invention is described with regard to the Example given below, it being understood that this example is intended to be illustrative but is not intended to be limiting in any way, as the present invention could optionally incorporate any number of different mechanisms for performing the molecular computing.

EXAMPLE 1

Construction and Operation of Biomolecular Computing Machine

This Example describes an optional, illustrative, non-limiting implementation of a biomolecular automaton or computing machine according to the present invention, implemented with DNA molecules as the polymeric biomolecules. The logic diagram for this automaton is given in FIG. 1-1. The results indicate that the automaton according to the present invention is clearly operable, and provides expected and reproducible results from different exemplary inputs.

Methods

Synthetic DNA Double-stranded synthetic DNA molecules were prepared by annealing 2,000 pmol of commercially obtained deoxyoligonucleotides (Sigma-Genosys) in a final volume of 10 µl of 10 mM Tris-HCl buffer, pH 8.0, containing 1 mM EDTA and 50 mM NaCl. The annealing was performed by heating the solution to 94° C. followed by slow cooling. The formation of a duplex was confirmed by native PAGE (20%). The oligomers were 5'-phosphorylated and PAGE-purified by the supplier and used without further purification.

Input molecules These were constructed stepwise by ligating one or more synthetic DNA segments of the desired sequence to a 1,457-bp fragment obtained by digestion of the pBluescript II SK+ plasmid (Stratagene) with FokI, followed by polymerase chain reaction (PCR) amplification of the coding segment and a 300- or 325-bp tail region. The sequences of the resulting input molecules were confirmed by sequencing.

Output-detecting molecules The output-detecting molecule for the S0 output (S0-D) was formed by ligating a synthetic adapter of 30 bp containing a FokI recognition site to a 181-bp fragment obtained by digesting the pBluescript II SK+ plasmid with FokI, PCR amplification and additional FokI digestion to form the 160-bp fragment bearing the desired sticky end. The output-detecting molecule for the S1 output (S1-D) was obtained by PCR amplification of a 285-bp fragment corresponding to positions 1,762-2,047 of the pBluescript II SK+ plasmid followed by FokI digestion of the PCR product to form a 250-bp fragment.

Computation reactions Reactions were set by mixing 2.5 pmol of the input molecule, 1.5 pmol of each output-detection molecule and 15 pmol of each transition molecule with 12 units of FokI and 120 units of T4 DNA Ligase (both from New England Biolabs) in 120 µl of NEB4 buffer supplemented with 1 mM ATP and incubating at 18° C. for 70 min. In case of multiple inputs in the same reaction, equal amounts were used, summing up to 2.5 pmol. The mixtures were purified by the Qiagen PCR purification kit and eluted using 30 µl EB buffer (Qiagen). Aliquots (10 µl) were assayed by gel electrophoresis using 3% MetaPhor agarose (FMC Bioproducts) unless indicated otherwise. The lengths of the DNA species were verified using a commercial 50-bp DNA step ladder (Promega). To further confirm that output reporting molecules were formed as expected, PCR amplification and sequencing was performed on the output-detection molecule/output molecule junction region in both output-reporting molecules S0-R and S1-R and found the expected sequences (not shown).

Results

The exemplary molecular finite automaton was implemented with a mixture of the class IIS restriction nuclease FokI, T4 DNA ligase and ATP, while the software comprises eight short double-stranded (ds) DNA molecules, the 'transition molecules' (FIG. 2a), which encode the eight possible transition rules (FIG. 1-1c). A dsDNA molecule encodes the initial state of the automaton and the input (FIG. 2b), with six base pairs (bp) coding for one input symbol (FIG. 2c). The system also contains 'peripherals', two output-detection molecules of different lengths (FIG. 2d), each of which can interact selectively with a different output molecule to form an output-reporting molecule that indicates a final state and can be readily detected by gel electrophoresis. The computation starts when the hardware, software and input are all mixed together and runs autonomously, if possible till termination. If the peripherals are also mixed then output reporters are formed in situ on termination.

The automaton processes the input as shown in FIG. 2e. First, the input is cleaved by FokI, thereby exposing a four-nucleotide sticky end that encodes the initial state and the fist input symbol. The computation proceeds via a cascade of transition cycles. In each cycle the sticky end of an applicable transition molecule ligates to the sticky end of the input molecule, detecting the current state and the current symbol. The product is cleaved by FokI inside the next symbol encoding, exposing a new four-nucleotide sticky end. The design of the transition molecules ensures that the 6-bp-long encodings of the input symbols a and b are cleaved by FokI at only two different 'frames' [16], the leftmost frame encoding the state S1 and the rightmost frame encoding S0 (FIG. 2c). The exact next restriction site and thus the next internal state are determined by the current state and the size of the spacers (FIG. 2a, green) in an applicable transition molecule. The computation proceeds until no transition molecule matches the exposed sticky end of the input or until the special terminator symbol is cleaved, forming an output molecule that has a sticky end encoding the final state. In a step extraneous to the computation and analogous to a 'print' instruction of a conventional computer, this sticky end ligates to one of two output detectors and the resultant output reporter is identified by gel electrophoresis.

The operation of the exemplary automaton was tested by running it with a selection of programs on various inputs (FIG. 3a). Each lane in the gel-electrophoresis image presents the result of running an indicated program on a specified input, showing the predicted output reporters in all cases or suspending where expected. The incorrect formation of a small amount of S1-R in an A6-aba computation and the formation of an unidentified product in an A5-aba computation were probably due to an artifact. FIG. 3b shows computations of automaton A1 (FIG. 1-1a) on 6-symbol-long inputs, producing the expected outputs.

In all reactions, each input molecule initiates an independent parallel computation. Thus, the results depicted in FIGS. 3a and b represent $10^{12}$ automata operating in parallel. To illustrate this independence, we ran the same program on a mixture of two different inputs. FIG. 3c shows that both output reporters were formed when expected. In the case of expected suspension on one of the inputs, a single correct reporter was formed.

A non-deterministic automaton A7 was also tested (FIG. 1-1d). Only computations on input aabb reached the accepting state S0, though some computations on this input reached state S1 and some suspended owing to different non-deterministic choices, as expected (FIG. 3d). Although the deterministic equivalent of A7 requires three states and cannot be programmed in this present non-limiting example, using a non-deterministic approach in real applications is disadvantageous as the yield decreases exponentially with the number of non-deterministic choices made during a computation.

Thus, these results clearly support the efficacy and capabilities of the automaton according to the present invention, demonstrating that the automaton is capable of reproducible, predictable behavior for any particular input.

EXAMPLE 2

Validation of Biomolecular Computing Machine

Figure 4C:
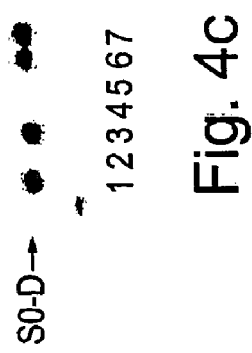
Figure 4A:
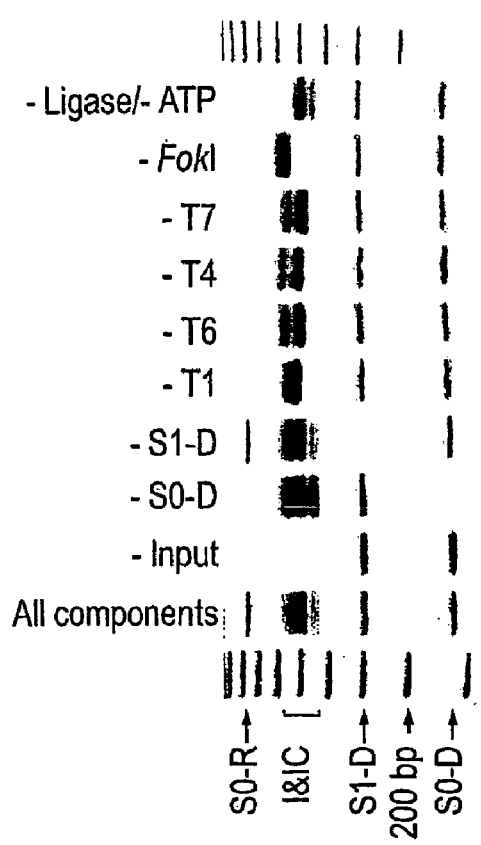

The mechanism of operation of the automaton (biomolecular computing machine) of the present invention was validated by the results of three experiments: omission of single components, analysis of the intermediates, and measurement of computation fidelity. The results of these validation operations are shown in FIG. 4. First, A1 was run on ababaa, omitting a single reaction component at a time (FIG. 4a). No output reporters could be detected once an essential component was omitted except for the case of T6 removal, an incorrectness similar to the case of the A6-aba computation, since without wishing to be limited to a single hypothesis, apparently other transitions performed the role of T6 (with very low efficiency); a kind of error. In addition, omitting ligase did not seem to impair the formation of the output molecule, although without ligase the reporter could not be detected (see Example 3 below for more details).

Figure 4B:
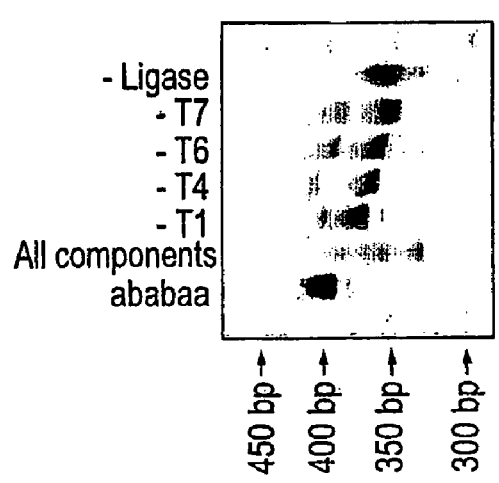

In the second experiment, the sizes of computation intermediates were analyzed (FIG. 4b). The A1 program with input ababaa uses all its transition molecules in the order T1, T4, T6, T7 in the first four cycles. Thus, removal of each transition molecule would suspend the computation in each of its first four intermediates. These molecules would accumulate, 'waiting' for hybridization with the missing transition molecule, together with the product of the reverse ligation with a fragment restricted at the previous cycle (FIG. 2e). This experiment was performed with a $^{32}$P-labelled ababaa input. The expected sizes of the intermediates were compared to the actual sizes obtained using a calibration curve based on the standards ladder. The correctness of this measurement is ±1% (±3.5 bp). The sizes of the 'restricted' (lower) bands are shown in the following (measured, predicted) pairs for each removed transition molecule: (−T1): (365±4, 360); (−T4): (357±4, 354); (−T6): (352±4, 350); (−T7): (344±4, 344). The differences between the lengths of the intermediates are 8, 5 and 8 bp between the first and second, second and third, and third and fourth intermediates, respectively. The predicted values are 6, 4 and 6 bp, respectively. These data support the proposed mechanism within the experimental error. Additional experiments have supported these results (data not shown).

In the third experiment, the computation fidelity was measured by increasing the detection sensitivity using $^{32}$P-labelled output detectors. In two computations with opposite predicted outputs, no incorrect products could be detected even after prolonged exposure. Given the detection limit, the overall fidelity of the computations is at least about 99%, implying more than 99.8% fidelity per transition (FIG. 4c).

EXAMPLE 3

Self-Powered Biomolecular Automata

This example describes experiments which demonstrate the operation of this exemplary embodiment of the molecular computing device according to the present invention, and in particular, its ability to fuel computations by using the input as energy.

A biomolecular computing machine was developed according to these preferred aspects of the present invention, and is shown with regard to FIG. 5. As above, double-stranded (ds) DNA molecules with sticky ends realize both the software (FIG. 5b) and the input (FIG. 5c) and the class IIS restriction enzyme FokI functions as the hardware (FIG. 5a).

Unlike the previous example, the core computational step (FIG. 5e) of the device according to the present invention preferably does not use energy-consuming ligase to bond the hybridized input molecule and software molecule. Rather, it utilizes a hitherto unknown capability of FokI to cleave DNA in the presence of a non-covalent hybridization complex between its recognition and cleavage sites. As a beneficial side-effect, and unlike previous work, the software molecule used in this step is not damaged, since it dissociates spontaneously from the hybridized input symbol after it has been cleaved (FIG. 5e), rendering the transition irreversible and the software molecule reusable for subsequent transitions. Hence the software molecules (FIG. 5b) effectively operate as a family of cofactors of variable specificity to FokI, each determining a specific FokI cleavage site on the input molecule.

This is reminiscent of RNA interference [20] (RNAi), where short dsRNA (siRNA) molecules target ribonucleases to specific mRNA molecules.

Each computational step cleaves and scatters one input symbol, a short duplex with an even shorter double-stranded region (3 to 5-bp), which probably dissociates in solution to single-stranded DNA (FIG. 5e). For very long inputs the accumulation of these byproducts in solution may slow the computation down by reversibly binding to the sticky ends of the input and the software, and collection and removal of these byproducts, or "garbage collection" may optionally be considered.

The computation proceeds until no software molecule matches the state-symbol pair encoded by the exposed sticky end, or until the special terminator symbol is cleaved. This final state encoded by the output molecule can be identified according to either its length (FIG. 6) or its sticky end, as described above.

The realization of Ligase-free operation through removal of Ligase and ATP had previously proved to be impossible, requiring important changes to the earlier design. Experiments suggested that the newly uncovered ability of FokI to cleave DNA with its recognition and cleavage sites attached by sticky-end hybridization is limited to specific hybridization complexes. In order to identify these complexes, the composition of the spacer between the FokI recognition site and the sticky end, as well as the length of the spacer and the composition of the sticky end was changed, with complementary modifications to the input molecules. It was observed that long spacers and low GC content often resulted in cleaving only one of the input strands, producing a computationally illegal configuration. Correct performance was achieved with short spacers and high GC content of the sticky ends. Hence the final design utilizes the shortest possible spacers of zero, 1- and 2-bp (FIG. 5b), which dictated a particular symbol encoding (FIG. 5d) and the introduction of spacers between the symbols (FIG. 5c).

To optimize reaction conditions, the relative abundance of the Hardware-Software-Input complex was calculated for different initial concentrations of these molecules, assuming dissociation constants of 2 nM [21] for the Hardware-Software complex and 50 micromolar for Software-Input hybrid. The highest proportion of the complex was computed to be at equimolar ratio of hardware and software molecules, the absolute concentrations of both being in the micromolar range and in excess of the input. Therefore, without wishing to be limited by a single hypothesis, it would appear that the reactive species is a tight [21] Hardware-Software complex, possessing both recognition and cleavage capabilities. Indeed, experiments showed that pre-incubation of hardware and software molecules prior to input addition resulted in almost a two-fold rate increase, supporting this suggestion.

The operation and efficiency of the molecular computing device according to the present invention is described in greater detail below, with regard to the specific experiments that were performed.

Methods

Preparation of the machine components. 1) FokI: was obtained from New England Biolabs at a concentration of 54 micromolar (60 u/microliter). 2) Software and input molecules: single stranded components of the software and input molecules were obtained from Sigma-Genosys and purified to homogeneity using a 15% denaturing acrylamide gel (40 cm×1.5 mm) containing 8 M urea [22]. The software molecules and the 'terminator' blocks of the input molecules (composed of a 15-bp double stranded 'tail', a terminator symbol and three or four symbols, so that each 'terminator' block was itself a functioning input) were prepared by annealing equimolar (100-200 micromolar) amounts of the sense and antisense strands in the presence of 50 mM NaCl. The annealing was performed by heating the mixture to 94° C. and slow cooling to room temperature. 3) Long input molecules were constructed by stepwise ligation of four-symbol-long double stranded building blocks (whose single-stranded components were PAGE-purified to homogeneity as described above) to the 'terminator' block. When labeled inputs were required, 20 pmol of the antisense strands of the 'terminator' blocks were $^{32}$P-labelled and added to a varying amount of unlabelled oligonucleotides (typically 2000 to 6000 pmol each) prior to annealing. All other blocks were non-labeled. Termini expected to undergo ligation were phosphorylated. In a typical reaction, 6000 pmol of a substrate oligonucleotide was phosphorylated by 160 micro-units of Polynucleotide Kinase (New England Biolabs) in 240 microliter of PNK buffer supplied with 1 mM ATP, for 60 min at 37° C. and ethanol-precipitated afterwards. Double stranded blocks (1500 pmol of each) were ligated together by T4 DNA Ligase (New England Biolabs, ~1700 micro-units) in 400 microliter of T4 DNA Ligase buffer at 16° C. for 1 hour. The ligation products were ethanol-precipitated and purified from native PAGE (12%, 16 cm×1.5 mm) [23]. The concentrations of the purified duplexes were measured by GeneQuant apparatus (Pharmacia). Single-nucleotide extrusions instead of blunt ends were designed in all the substrates, to avoid blunt-end ligations in control experiments in the presence of the Ligase.

Computation reactions. In a typical reaction the FokI hardware enzyme was added in a 1:1 ratio to the software molecules, while each software molecule was maintained at least at 1 micromolar concentration and at the same time in excess of or equal to the input. The reactions were performed in 10 microliter of NEB4 buffer at 8° C. They were assayed by 20% denaturing PAGE using input molecules labeled in the 5'-terminus of the antisense strands. In this assay, formation of S0 output was represented by a 15-nt long product and the S1 output was a 16-nt long band.

Determining the reaction performance. The performance was optimized with the software A2 and an input I3. In order to calculate the total number of operations, the gel images were analyzed using Image Gauge 3.41 software (Fuji). The relative amounts of unreacted input, the intermediates and the output were measured assuming the linear dependence between the signal intensity and the amount of radioactive label. The total number of steps was calculated according to the formula $$S = N \sum_{i=1...L} i\chi_i$$

where S is a total number of steps, N is a total number of molecules, L is an input length (in symbols), and $\chi_i$ is a relative abundance of an i'th intermediate.

Free energy change under reaction conditions was determined according to the formula $$\Delta G = \Delta G^0 + RT\ln Q, Q = \frac{[3'\text{-OH}][5'\text{-OPO}_3^{2-}]}{[R\text{-OPO}_3\text{-R}']}$$

where [3'-OH] is a concentration of free 3'-termini, [5'-OPO$_3^{2-}$] is a concentration of free 5'-phosphates and [R—OPO$_3$—R'] is a concentration of the potential cleavage sites (and not a total concentration of the phosphodiester bonds). For a 7-symbol input at the initial concentration of 5 micromolar, Q changes from $3.3 \times 10^{-7}$ after first step to $3.6 \times 10^{-5}$ after 6 steps. The addition to the standard free energy ranges from $-34.7$ kJ/mol to $-23.8$ kJ/mol, accordingly. The average value of $-29.3$ kJ/mol was used for energy dissipation calculations.

Conclusive evidence for the ability of FokI to perform a transition based on hybridization without ligation was supplied by the experiment shown in FIG. 6a. A one-symbol input, complementary software and FokI were incubated together, and phosphorylated and non-phosphorylated 5'-termini of the input and software molecules were compared. It was clearly shown that the reaction proceeded independently of the 5'-phosphate availability and therefore it was Ligase-independent[12]. In addition, the software molecule did not undergo any change as judged from the gel image, and therefore served as a dsDNA cofactor for the enzyme.

This new Ligase- and ATP-free system retains the computational capabilities of the previous finite automaton [14] and even outperforms it. Three different software programs (FIGS. 1-2a and 1-2c) were applied to a selection of eight different inputs up to 12 symbols long (FIG. 1-2d). In each case the major output molecule was formed in agreement with the prediction (FIG. 6b). The byproducts visible at the locations of the incorrect outputs cannot be unambiguously assigned at this stage. The correctness of the computation, based on the worst-case assumption that the byproducts represent incorrect outputs, depends on the software.

Single-step fidelity of 99.9% was obtained with the input I8 and the software A3, while the average value for 12-symbol inputs was ~99.5%. Analysis of the correctness using detection molecules able to hybridize selectively to different outputs[4] indicates that at least some of the byproducts do not represent real errors, and the average single-step fidelity is ~99.9% (data not shown).

System performance was then optimized in two respects. First, the basic computational speed was improved by minimizing the duration of a computational step per input molecule. The fastest computation was achieved when 4 micromolar of the A2 software (1 micromolar of each software molecule) and 4 micromolar hardware were mixed with 10 nM of the I3 input at 8° C., which was consistent with the prediction discussed above. This computation proceeded with an initial rate of 20 seconds per step per input molecule, about 50-fold improvement compared to the previous system [14] (1000 sec/step/molecule). The initial rates obtained over the first 30 sec of the reaction were used, since at longer sampling times the fully processed input molecules accumulated, introducing an incorrect bias towards lower performance figures.

Second, the parallel performance of the system was increased by maximizing the total number of operations performed per second in a unit solution volume. The maximal number of operations was achieved when 10 micromolar software molecules representing the automaton A2 (2.5 micromolar of each kind) and 10 micromolar FokI were pre-incubated at 8° C. for 30 min and then mixed with 5 micromolar of the I3 input. This system computed at a combined initial rate of $6.646 \times 10^{10}$ operations/sec/microliter, an ~8000-fold improvement over the previous system ($8.3 \times 10^6$ operations/sec/microliter). The single-step duration at these conditions was ~45 seconds—only about two times slower than in the fastest reaction.

The energy dissipation of the system was evaluated as follows. Correcting the standard free energy change upon hydrolysis of a DNA phosphodiester bond [24] of $-22.15$ kJ/mol [24] for these reaction conditions gives to $-51.4$ kJ/mol, equaling $-22.1$ kT/bond and $-44.2$ kT/transition. Under the same conditions we perform $6.6 \times 10^{10}$ transitions/sec/microliter resulting in a dissipation rate of $1.02 \times 10^{-8}$ W/microliter. Reaction rates were surprisingly insensitive to the temperature and exhibited similar kinetics over the range 2-20° C. This might represent a tradeoff between a decrease in the stability of the sticky ends interaction and an increase in enzyme activity as the temperature increases.

The reusability of software molecules was demonstrated by using a small amount of software to process a large amount of input (FIG. 6c). Based on the molar concentrations of input and software and the amount of the intermediates and the output it can be deduced that during this computation one type of software molecule (T8) performed on the average 54 transitions per molecule, with some molecules necessarily performing many more transitions than the average.

EXAMPLE 4

Illustrative System and Device with Biomolecular Automaton

As described above, the biomolecular automaton according to the present invention is capable of efficient, reproducible operations for performing one or more computations. This Example extends the initial examples above of biomolecular automata which contain DNA as the biomolecule, to non-limiting, illustrative system, and device which each use such automata as basic components.

According to a preferred embodiment of the present invention, there is provided a device which preferably includes at least one biomolecular automaton, as described above, which operates with at least one manipulation of the biomolecule in order to perform a computation. In addition, the device preferably features a detector for detecting the manipulation of the biomolecule to perform the computation. An exemplary implementation of such a device is shown with regard to FIG. 7.

As shown, a device 100 preferably features a biomolecular automaton 102, of which a plurality may optionally be present (not shown). Biomolecular automaton 102 preferably features an input 104, more preferably comprising at least one biomolecule 106. Biomolecular automaton 102 also preferably features a plurality of biomolecule-manipulating components 108 for manipulating biomolecule 106.

Device 100 may optionally and preferably feature a container 110 for containing biomolecular automaton 102, of which a plurality of such containers 110 may optionally be used (not shown).

Device 100 preferably also features a detector 114. Detector 114 may optionally detect at least one of an occurrence of the manipulation and a result of the manipulation. Detector 114 is preferably in sufficient proximity to biomolecular automaton 102 to be capable of detecting the manipulation.

Device 100 also preferably features a regulatory component 112, for regulating at least one activity of at least one biomolecule-manipulating component 108. Regulatory component 112 is optionally and preferably also located at, or input to, biomolecular automaton 102.

With regard to the preferred embodiment of the present invention, with DNA and/or RNA as biomolecule 106, regulatory component 112 is preferably also DNA and/or RNA, and may optionally be considered to be as analogous to "software". Detector 114 may optionally be embodied according to any type of device for detecting the presence of DNA and/or RNA, and may also include another DNA and/or RNA molecule (not shown) as at least a part of detector 114; see Example 1 above for a description. Detector 114 may optionally and preferably comprise a gel electrophoresis apparatus, or alternatively may optionally comprise any type of apparatus for detecting biomolecule 106, and more particularly the manipulation(s) performed on biomolecule 106. Device 100 may also optionally be realized as a combination of biomolecular automaton 102 and an automated DNA sequencing machine, for example.

As shown in FIG. 8, a system 200 according to the present invention preferably features device 100, as described with regard to FIG. 7. System 200 also preferably features an analyzer 210 for analyzing a result of the manipulation(s) that are detected by detector 114.

EXAMPLE 5

Implementation with Peptides

Although polynucleotides, such as DNA or RNA, or analogs or derivatives thereof as previously described, are the preferred biomolecules for implementing the present invention, it is also possible to use peptides as the biomolecules. For the previous example with DNA, the hardware of the automaton preferably includes biomolecule-manipulating enzymes, such as restriction nuclease(s) and ligase(s), the software and input are preferably encoded by double-stranded DNA, and programming is preferably performed by choosing appropriate software DNA molecules. Upon mixing solutions containing these components, the automaton processes the input molecule. For the preferred embodiment of the present invention, such processing is performed through a cascade of restriction, hybridization and ligation cycles, producing a detectable output molecule that encodes the final state of the automaton, and thus the computational result.

By analogy, therefore, an automaton according to the present invention could optionally use peptides for the software and input. The hardware would then preferably comprise peptide-cleaving enzymes, which may have specificity for a sequence within a peptide, analogous to a restriction endonuclease; or which may cleave a peptide bond with less or no specificity.

With regard to hybridrization, a preferred part of the operation of the automaton for DNA as input, this process may also optionally be performed with peptides. The peptides (provided as software and/or as input) may be selected so as to hybridize with each other. One optional method for such a selection is described with regard to U.S. Pat. No. 5,212,072, issued on May 18 1993, hereby incorporated by reference as if fully set forth herein. The described method involves providing a peptide and a nucleotide acid sequence coding for that peptide; selecting a second nucleotide acid sequence that is anti-sense to the first sequence; and obtaining a second peptide for which the second sequence codes. The patent demonstrates that the second peptide typically binds to the first peptide, which would provide the preferred stage of hybridization.

Further analogies could optionally be made to extend the present invention for use with peptides as the biomolecules.
Conclusions The automaton of the present invention may optionally be a component of a device, system and/or method for performing one or more computations with a biomolecule, preferably with a polynucleotide molecule such as DNA for example.

The computing performance and energy consumption of the system has been estimated. A computation over 2.5 pmol ($1.5 \times 10^{12}$ molecules) of a 4-symbol-long input rendered output-reporting molecules with ~50% yield, producing $7.5 \times 10^{11}$ outputs in 4,000 s. As each output is the result of five transitions, the computing performance is of the order of $10^9$ transitions per second. With regard to energy consumption, in each transition two ATP molecules were consumed, releasing $1.5 \times 10^{-19}$ J. Multiplying this number by the transition rate provides an energy consumption rate of ~$10^{-10}$ J s$^{-1}$, or $10^{-10}$ W. Cost of construction of the input, software and hardware is not normally included when measuring the energy consumption of electronic computers and is not included here, although the system of the present invention preferably also features recycling of 'software molecules' and of course additional energy to separate and 'read' the output through some type of detector for the formed biomolecules, such as through gel electrophoresis for example. This adds a significant continuing energy cost not normally encountered in electronic computers. On the other hand, the detector may optionally be selected according to the particular biomolecule and/or the "hardware", or biomolecule-manipulating components, in order to preferably minimize such an energy cost.

Any increase in the complexity of the system (number of symbols times the number of states) is bounded from above by the number of different non-palindromic sticky ends. The distribution between states and symbols depends on the length of the spacer between the recognition site and the restriction site of the particular restriction enzyme employed, with FokI enabling a machine with at most three states and several tens of symbols. The preferred construction of biomolecule-manipulating components having particular properties, such as IIS enzymes with longer spacers and/or longer sticky ends [38], may optionally support the construction of automata according to the present invention with increased complexity, linearly related to size of the spacer and exponentially related to the size of the sticky end formed on restriction.

The molecular computing machine according to the present invention dissipates about 44 kT per transition, which is about 63 times higher than kTin 2, the theoretical energy gain of randomizing a known bit [2]. Although one can envision other information-destruction computing machines that dissipate smaller amounts of heat at the expense of reduced speed and/or reduced precision, biopolymer hydrolysis is a preferred embodiment of the present invention, as it seems to offer the most natural balance between these three parameters.

REFERENCES

[1]. Bennett C. H. The thermodynamics of computation—a review. *Int. J. Theor. Phys.* 21, 905-940 (1982).

[2]. Feynman R. P. *Feynman lectures on computation*, Hey and Allen (eds.), (Perseus Publishing, USA, 1999).

[3]. Landauer, R. Irreversibility and heat generation in the computing process. *IBM J Res. Develop.* 3, 183-191 (1961). 4. Keyes, R. W., Landauer, R. Minimal energy dissipation in logic. *IBM J Res. Develop.* 14, 152-156 (1970).

[4]. Keyes, R. W., Landauer, R. Minimal energy dissipation in logic. *IBM J. Res. Develop.* 14, 152-156 (1970).

[5]. Bennett C. H. Logical reversibility of computation. *IBM J. Res. Develop.* 17, 525-532 (1973).

[6]. Bennett C. H. Notes on the history of reversible computation. *IBM J. Res. Develop.* 32, 16-23 (1988).

[7]. Fredkin, E. & Toffoli, T. Conservative logic. *Int. J. Theor. Phys.* 21, 219-253 (1982).

[8]. Benioff, P. Quantum mechanical models of Turing machines that dissipate no energy. *Phys. Rev. Lett.* 48, 1581-1585 (1982).

[9]. Zurek, W. H. Thermodynamic cost of computation, algorithmic complexity and the information metric. *Nature* 341, 119-124 (1989).

[10]. M. Li and P. M. B. Vitanyi, Reversibility and adiabatic computation: trading time and space for energy. *Proc. Royal Society of London, Series A*, 452, 769-789 (1996).

[11]. Michael Frank, Reversibility for Efficient Computing, Ph. D. Thesis, MIT AILab, 1999.

[12]. Alberts, B. et al *Molecular biology of the cell* 3rd edn (Garland Publishing, Inc. New York, N. Y., USA, 1994).

[13]. Hopcroft, J. E., Motvani, R. & Ullman, J. D. *Introduction to Autonlata Theory, Languages and Computation* 2nd edn (Addison-Wesley, Boston, Mass., 2000).

[14]. Benenson, Y. et al. Programmable and autonomous computing machine made of biomolcules. *Nature* 414, 430434 (2001).

[15]. Adelman, L. M. Molecular computation of solutions to combinatorial problems. *Science* 266, 1021-1024 (1994).

[16]. Rothemund, P. W. K. in *DNA Based Computers: Proceedings of the DIMACS Workshop*, Apr. 4, 1995, Princeton University (eds Lipton, R. J. & Baum, E. B.) 75-119 (American Mathematical Society, Providence, R1, 1996).

[17]. Winfree, E., Liu, F. R., Wenzler, L. A., Seeman, N. C. Design and self-assembly of two-dimensional DNA crystals. *Nature* 394, 539-544 (1998).

[18]. Khodor, J., Gifford, D. K. Design and implementation of computational systems based on programmed mutagenesis. *Biosystems* 52(1-3), 93-97 (1999).

[19]. Ruben, A. J., Landweber, L. F. The past, present and future of molecular computing. *Nature Rev. Mol. Cell Biol.* 1, 69-72 (2000).

[20]. Zamore, P. D. RNA interference: listening to the sound of silence. *Nat. Struct. Biol.* 8, 746-750 (2001).

[21]. Kim, S. C., Skowron, P. M., Szybalsli, W. Structural requirements for FokI-DNA interaction and oligodeoxyribonucleotide-instructed cleavage. *J. Mol. Biol.* 258, 638-649 (1996).

[22]. Ellington, A., Pollard, J. D., Jr. in *Current Protocols in Molecular Biology* (eds. Ausubel, F. M. et al) 2.12.1-2.12.7 (John Wiley and Sons, USA, 1998).

[23]. Chory, J., Pollard, J. D., Jr. in *Current Protocols in Molecular Biology* (eds. Ausubel, F. M. et al) 2.7.1-2.7.8 (John Wiley and Sons, USA, 1998).

[24]. Dickson, K. S., Burns, C. M., Richardson, J. P. Determination of the free-energy change for repair of a DNA phosphodiester bond. *J. Biol. Chem.* 275, 15828-15831 (2000).

[25]. Turing, A. M. On computable numbers, with an application to the Entcheidungproblem. *Proc. Lond. Math. Soc. II Ser.* 42, 230-265 (1936).

[26]. McCulloch, W. S. & Pitts, W. A logical calculus immanent in nervous activity. *Bull. Math. Biophys.* 5,115-133 (1943).

[27]. Smith, W. D. in *DNA Based Computers: Proceedings of the DIMACS Workshop*, Apr. 4, 1995, Princeton University (eds Lipton, R. J. & Baum, E. B.) 121-185 (American Mathematical Society, Providence, R. I., 1996).

[28]. Garzon, M. et al. in *Automata Implementation: Lecture Notes in Computer Science* 1436 (eds Wood, D. & Yu, S.) 56-74 (Springer, Berlin, 1998).

[29]. Shapiro, E. & Karunaratne, K S. G. Method and system of computing similar to a Turing machine. U.S. Pat. No. 6,266,569 (2001).

[30]. Lipton, R. J. DNA solution of hard computational problem. *Science* 268, 542-545 (1995).

[31]. Ouyang, Q., Kaplan, P. D., Liu, S. & Libchaber, A. DNA solution of the maximal clique problem. *Science* 278, 446-449 (1997).

[32]. Landweber, L. F., Lipton, R. J. & Rabin, M. O. in *DNA Based Computers III: DIAMCS Workshop*, June 23-27, 1997, University of Pennsylvania (eds Rubin, H. & Wood, D. H.) 161-172 (American Mathematical Society, Providence, R. I., 1997).

[33]. Liu, Q. et al. DNA computing on surfaces. *Nature* 403, 175-179 (2000).

[34]. Faulhammer, D., Cukras, A. R., Lipton, R. J. & Landweber, L. F. Molecular computation: RNA solutions to chess problems. *Proc. Natl. Acad. Sci. USA* 97, 1385-1389 (2000).

[35]. Sakamoto, K. et al. State transitions by molecules. *Biosystems* 52, 81-91 (1999).

[36]. Hartemink, A. J., Gifford, D. K. & Khodor, J. Automated constraint-based nucleotide sequence selection for DNA computation. *Biosystems* 52, 227-235 (1999).

[37]. Mao, C., LaBean, T. H., Reif, J. H. & Seeman, N. C. Logical computation using algorithmic self-assembly of DNA triple-crossover molecules. *Nature* 407, 493-496 (2000).

[38]. Chandrasegaran, S. & Smith, J. Chimeric restriction enzymes: What is next? *Biol. Chem.* 380, 841-848 (1999).

[39]. Proceedings of the Meetings on DNA Based Computers, DIMACS, 1995, 1996, 1997, 1998, and Eric Winfree's Ph. D. Thesis, Algorithmic Self-Assembly of DNA, Caltech, May, 1998

[40]. Eiilc Winfree, Simulations of Computing by Self-Assembly, Preliminary Proceedings of the Fourth International Meeting on DNA Based Computers, DIMAACS, Jun. 15-19, 1998, University of Pennsylvania, edited by Lila Kari, Harvey Rubin and David Harlan Wood, pages 213-239, and references thereto.

The invention claimed is:

1. A programmable finite state biomolecular automaton for performing a computation wherein said computation is performed autonomously in a single solution-and container, comprising: (a) a polymeric biomolecule as input to the automaton comprising substrate polymeric biomolecules and transition biomolecules, such that the automaton is programmable according to a selection of said polymeric biomolecule; and (b) a plurality of biomolecule-manipulating components with the proviso that said biomolecule-manipulating components do not include a polymerase; wherein the automaton is capable of forming an output biomolecule by manipulating said biomolecule with said plurality of biomolecule-manipulating components, wherein each manipulation is autonomously performed in the absence of external intervention to perform the computation such that said output biomolecule comprises a result of the computation; and wherein said input, manipulating, and output biomolecules are mixed in said single container forming said single solution.

2. The automaton of claim 1, wherein the automaton is also programmable according to a combination of biomolecule-manipulating components and said selection of said polymeric biomolecule.

3. The automaton of claim 1, further comprising an additional biomolecule in addition to said input biomolecule, said additional biomolecule comprising a transition molecule.

4. The automaton of claim 1, further comprising: (c) at least one operational control component for at least partially controlling said manipulation of said biomolecule.

5. The automaton of claim 4, wherein said at least one operational control component comprises at least one additional biomolecule.

6. The automaton of claim 5, wherein said at least one additional biomolecule comprises a type of biomolecule that is substantially similar to said biomolecule.

7. The automaton of claim 1, wherein said output biomolecule is detectable, and wherein an overall fidelity of the computation is at least about 99% according to a limit of detection of said output biomolecule.

8. The automaton of claim 1, wherein said biomolecule comprises a polynucleotide.

9. The automaton of claim 8, wherein said polynucleotide comprises DNA.

10. The automaton of claim 8, wherein said plurality of biomolecule-manipulating components comprises at least one restriction enzyme for cutting said biomolecule.

11. The automaton of claim 8, wherein said plurality of biomolecule-manipulating components comprises at least one ligase for ligating said biomolecule.

12. The automaton of claim 11, wherein said biomolecule comprises a plurality of biomolecules and said ligase ligates at least two of said plurality of biomolecules.

13. The automaton of claim 8, wherein said plurality of biomolecule-manipulating components comprises at least one nuclease.

14. A device for performing a computation, comprising: (a) a polymeric finite state biomolecular automaton, said automaton comprising: (i) a polymeric biomolecule as input to the automaton; and (ii) a plurality of biomolecule-manipulating components capable of manipulating said biomolecule, wherein said biomolecule and said plurality of biomolecule-manipulating components operate autonomously without external intervention and wherein said automaton is contained in a single container and solution; with the proviso that said biomolecule-manipulating components do not include a polymerase; and (b) a detector capable of detecting said at least one manipulation of said biomolecule to perform the computation.

15. The device of claim 14, wherein according to a detection limit, a fidelity of the computation is at least about 99%.

16. The device of claim 14, wherein said biomolecular automaton further comprises at least one output-detection molecule, for detecting an output biomolecule formed as a result of said at least one manipulation.

17. The device of claim 16, wherein said biomolecular automaton comprises a plurality of output-detection molecules having different characteristics, for interacting selectively with a different output biomolecule.

18. The device of claim 17, wherein at least one output-detection molecule comprises a detectable label.

19. The device of claim 18, wherein said detectable label comprises at least one of a radioactive label, a colorometric label, a magnetic or paramagnetic label, or a fluorescent label.

20. The device of claim 14, wherein said biomolecule comprises a polynucleotide.

21. The device of claim 20, wherein said polynucleotide comprises DNA.

22. The device of claim 20, wherein said detector comprises a gel electrophoresis apparatus.

23. A system for performing a computation, comprising: (a) a biomolecular automaton, said automaton comprising: (i) a biomolecule as input to the automaton; and (ii) a plurality of biomolecule-manipulating components capable of manipulating said biomolecule; wherein said automaton is contained in a single container and solution; with the proviso that said biomolecule-manipulating components do not include a polymerase; (b) a detector capable of detecting said at least one manipulation of said biomolecule, wherein said biomolecule and said plurality of biomolecule-manipulating components operate autonomously and without external intervention; and (c) an analyzer capable of analyzing a result of said at least one manipulation as detected by said detector.

24. The system of claim 23, further comprising: controlling said at least one manipulation of said biomolecule.

25. The system of claim 24, wherein said at least one operational control component comprises at least one additional biomolecule.

26. The system of claim 25, wherein said at least one additional biomolecule comprises a type of biomolecule that is substantially similar to said biomolecule.

27. The system of claim 23, wherein said output biomolecule is detectable, and wherein an overall fidelity of the computation is at least about 99% according to a limit of detection of said output biomolecule.

28. The system of claim 23, wherein said biomolecule comprises a polynucleotide.

29. The system of claim 28, wherein said polynucleotide comprises DNA.

30. The system of claim 29, wherein none of said biomolecule-manipulating components comprise a ligase.

31. A programmable finite state biomolecular automaton for performing a computation wherein said computation is performed autonomously in a single solution and container, comprising biomolecular hardware, software and input to produce a targeted, final state output biomolecule through a programmable computation comprising a cascade of biomolecular manipulations; wherein said biomolecular hardware, software and input are polymeric biomolecules; and wherein said computation is programmable by selecting said biomolecular hardware, software and input according to said final state output; and wherein said software comprises a plurality of biomolecular transition rules; and wherein said hardware comprises a plurality of biomolecule-manipulating components selected from the group consisting of enzyme, biomolecular chemical reactions, ligases, recombinases, topoisomerases, helicases and nucleases with the proviso that said biomolecule-manipulating components do not include a polymerase; and wherein the automaton is capable of forming said output biomolecule by manipulating said input biomolecules with said plurality of biomolecule-manipulating components wherein each manipulation is autonomously performed in the absence of external intervention to perform said computation such that said output biomolecule comprises a result of the computation; and wherein said manipulation comprises a cascade manipulation selected from the group consisting of restriction, hybridization and ligation cycles, producing said output molecule in said solution and container.

32. A programmable finite state biomolecular automaton for performing a computation wherein said computation is performed autonomously in a single solution and container, comprising: (a) a polymeric biomolecule as input to the automaton, such that the automaton is programmable according to a selection of said polymeric biomolecule; and (b) a plurality of biomolecule-manipulating components selected from the group consisting of enzyme, biomolecular chemical reactions, ligases, recombinases, topoisomerases, helicases and nucleases with the proviso that said biomolecule-manipulating components do not include a polymerase; wherein the automaton is capable of forming an output biomolecule by manipulating said input biomolecules with said plurality of biomolecule-manipulating components, wherein each manipulation is autonomously performed in the absence of external intervention to perform the computation such that said output biomolecule comprises a result of the computation; wherein said manipulation comprises a cascade of restriction, hybridization and ligation cycles, producing a detectable output molecule that encodes the computational result.

33. A system for performing a computation, comprising: (a) a biomolecular automaton, said automaton comprising: (i) a biomolecule as input to the automaton; and (ii) a plurality of biomolecule-manipulating components capable of manipulating said biomolecule consisting essentially of enzyme, biomolecular chemical reactions, ligases, recombinases, topoisomerases, helicases and nucleases for manipulating said biomolecule; wherein said automaton is contained in a single container and solution; wherein said biomolecule is manipulated by a plurality of different biomolecule-manipulating components; (b) a detector capable of detecting said at least one manipulation of said plurality of manipulations of said biomolecule, wherein said biomolecule and said plurality of biomolecule-manipulating components operate autonomously and without external intervention; and (c) an analyzer capable of analyzing a result of said at least one manipulation as detected by said detector.

* * * * *

SEQUENCE LISTING

```
<160> NUMBER OF SEQ ID NOS: 27

<210> SEQ ID NO 1
<211> LENGTH: 15
<212> TYPE: DNA
<213> ORGANISM: human

<400> SEQUENCE: 1
ggtcctacat gccga                                                    15

<210> SEQ ID NO 2
<211> LENGTH: 10
<212> TYPE: DNA
```

<213> ORGANISM: human

<400> SEQUENCE: 2
ggatgacgac                                                            10

<210> SEQ ID NO 3
<211> LENGTH: 17
<212> TYPE: DNA
<213> ORGANISM: human

<400> SEQUENCE: 3
ggtcctactg ctgccga                                                    17

<210> SEQ ID NO 4
<211> LENGTH: 15
<212> TYPE: DNA
<213> ORGANISM: human

<400> SEQUENCE: 4
ggtcctactg cgtcg                                                      15

<210> SEQ ID NO 5
<211> LENGTH: 17
<212> TYPE: DNA
<213> ORGANISM: human

<400> SEQUENCE: 5
ggtcctactg ctggtcg                                                    17

<210> SEQ ID NO 6
<211> LENGTH: 13
<212> TYPE: DNA
<213> ORGANISM: human

<400> SEQUENCE: 6
ggtcctactg acc                                                        13

<210> SEQ ID NO 7
<211> LENGTH: 15
<212> TYPE: DNA
<213> ORGANISM: human

<400> SEQUENCE: 7
ggtcctactg cgacc                                                      15

<210> SEQ ID NO 8
<211> LENGTH: 13
<212> TYPE: DNA
<213> ORGANISM: human

<400> SEQUENCE: 8
ggtcctaccg cgt                                                        13

<210> SEQ ID NO 9
<211> LENGTH: 15
<212> TYPE: DNA
<213> ORGANISM: human

<400> SEQUENCE: 9
ggtcctactg cgcgt                                                      15

<210> SEQ ID NO 10
<211> LENGTH: 12
<212> TYPE: DNA

<213> ORGANISM: human

<400> SEQUENCE: 10
ctggctcgca gc                                                          12

<210> SEQ ID NO 11
<211> LENGTH: 12
<212> TYPE: DNA
<213> ORGANISM: human

<400> SEQUENCE: 11
gaccgagcgt cg                                                          12

<210> SEQ ID NO 12
<211> LENGTH: 10
<212> TYPE: DNA
<213> ORGANISM: human

<400> SEQUENCE: 12
ggctcgcagc                                                             10

<210> SEQ ID NO 13
<211> LENGTH: 18
<212> TYPE: DNA
<213> ORGANISM: human

<400> SEQUENCE: 13
ggatgtacgg ctcgcagc                                                    18

<210> SEQ ID NO 14
<211> LENGTH: 21
<212> TYPE: DNA
<213> ORGANISM: human

<400> SEQUENCE: 14
ggtcctacat gccgagcgtc g                                                21

<210> SEQ ID NO 15
<211> LENGTH: 10
<212> TYPE: DNA
<213> ORGANISM: human

<400> SEQUENCE: 15
cctacgccga                                                             10

<210> SEQ ID NO 16
<211> LENGTH: 11
<212> TYPE: DNA
<213> ORGANISM: human

<400> SEQUENCE: 16
cctacggccg a                                                           11

<210> SEQ ID NO 17
<211> LENGTH: 10
<212> TYPE: DNA
<213> ORGANISM: human

<400> SEQUENCE: 17
cctacggtcc                                                             10

<210> SEQ ID NO 18
<211> LENGTH: 11
<212> TYPE: DNA

<213> ORGANISM: human

<400> SEQUENCE: 18
cctacgggtc c                                                        11

<210> SEQ ID NO 19
<211> LENGTH: 10
<212> TYPE: DNA
<213> ORGANISM: human

<400> SEQUENCE: 19
cctacgaccg                                                          10

<210> SEQ ID NO 20
<211> LENGTH: 10
<212> TYPE: DNA
<213> ORGANISM: human

<400> SEQUENCE: 20
cctacgcgtc                                                          10

<210> SEQ ID NO 21
<211> LENGTH: 23
<212> TYPE: DNA
<213> ORGANISM: human

<400> SEQUENCE: 21
cagggcctgg ctgccgcagg gcc                                           23

<210> SEQ ID NO 22
<211> LENGTH: 19
<212> TYPE: DNA
<213> ORGANISM: human

<400> SEQUENCE: 22
cggaccgacg gcgtcccgg                                                19

<210> SEQ ID NO 23
<211> LENGTH: 16
<212> TYPE: DNA
<213> ORGANISM: human

<400> SEQUENCE: 23
tggctgccgc agggcc                                                   16

<210> SEQ ID NO 24
<211> LENGTH: 12
<212> TYPE: DNA
<213> ORGANISM: human

<400> SEQUENCE: 24
acggcgtccc gg                                                       12

<210> SEQ ID NO 25
<211> LENGTH: 30
<212> TYPE: DNA
<213> ORGANISM: human

<400> SEQUENCE: 25
ggatgcccag ggcctggctg ccgcagggcc                                    30

<210> SEQ ID NO 26
<211> LENGTH: 30
<212> TYPE: DNA

```
<213> ORGANISM: human

<400> SEQUENCE: 26
cctacgggtc ccggaccgac ggcgtcccgg                                          30

<210> SEQ ID NO 27
<211> LENGTH: 11
<212> TYPE: DNA
<213> ORGANISM: human

<400> SEQUENCE: 27
cgtacgggtc c                                                              11
```